US010159126B2

(12) United States Patent
Welten

(10) Patent No.: US 10,159,126 B2
(45) Date of Patent: *Dec. 18, 2018

(54) LED BASED LIGHTING APPLICATION

(71) Applicant: ELDOLAB HOLDING B.V., Son en Breugel (NL)

(72) Inventor: Petrus Johannes Maria Welten, Oss (NL)

(73) Assignee: ELDOLAB HOLDING B.V., Son en Breugel (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,852

(22) Filed: Aug. 28, 2017

(65) Prior Publication Data

US 2018/0042075 A1 Feb. 8, 2018

Related U.S. Application Data

(63) Continuation of application No. 14/995,469, filed on Jan. 14, 2016, now Pat. No. 9,750,093, which is a (Continued)

(30) Foreign Application Priority Data

Sep. 5, 2008 (NL) ...................................... 2001959
Sep. 5, 2008 (NL) ...................................... 2001960

(51) Int. Cl.
*H05B 37/02* (2006.01)
*H05B 33/08* (2006.01)

(52) U.S. Cl.
CPC ......... *H05B 33/083* (2013.01); *H05B 33/089* (2013.01); *H05B 33/0812* (2013.01);
(Continued)

(58) Field of Classification Search
CPC .............. H05B 33/0815; H05B 33/083; H05B 33/0884; H05B 33/0851
(Continued)

(56) References Cited

U.S. PATENT DOCUMENTS 5,786,992 A 7/1998 Vinciarelli et al.
7,088,059 B2 8/2006 McKinney et al.
(Continued)

FOREIGN PATENT DOCUMENTS

CN 101137261 3/2008
CN 101252797 A 8/2008
(Continued)

OTHER PUBLICATIONS

Office Action dated Jul. 22, 2014 in corresponding application No. 098129307.

*Primary Examiner* — Thuy Vinh Tran
(74) *Attorney, Agent, or Firm* — Browdy and Neimark, PLLC

(57) ABSTRACT

The present invention relates to a lighting application, the lighting application comprises an LED assembly comprising a serial connection of two or more LED units, each LED unit comprising one or more LEDs, each LED unit being provided with a controllable switch for substantially short-circuiting the LED unit. The lighting application further comprises a control unit for controlling a drive unit and arranged to receive a signal representing a voltage level of the supply voltage, and control the switches in accordance with the signal. The invention further provides for an LED driver that enables to operate a TRIAC based dimmer at an optimal holding current and an LED driver comprising a switchable buffer, e.g. a capacitor.

27 Claims, 12 Drawing Sheets

Related U.S. Application Data continuation of application No. 13/062,588, filed as application No. PCT/NL2009/000170 on Sep. 3, 2009, now Pat. No. 9,271,345.

(60) Provisional application No. 61/120,585, filed on Dec. 8, 2008.

(52) U.S. Cl.
CPC ..... *H05B 33/0815* (2013.01); *H05B 33/0845* (2013.01); *H05B 33/0857* (2013.01); *H05B 33/0851* (2013.01); *H05B 33/0884* (2013.01)

(58) Field of Classification Search
USPC ........ 315/185 R, 123, 209 R, 247, 291, 294, 315/295, 299, 306, 308
See application file for complete search history.

(56) References Cited

U.S. PATENT DOCUMENTS

| | | | |
|---|---|---|---|
| 7,633,463 B2 | 12/2009 | Negru | |
| 7,649,326 B2 | 1/2010 | Johnson et al. | |
| 7,994,725 B2 | 8/2011 | Bouchard | |
| 8,174,212 B2 | 5/2012 | Tziony et al. | |
| 8,207,691 B2 | 6/2012 | Slot | |
| 8,471,495 B2 | 6/2013 | Muguruma et al. | |
| 8,742,674 B2 | 6/2014 | Shteynberg et al. | |
| 2003/0197477 A1 | 10/2003 | Hsieh | |
| 2006/0038803 A1* | 2/2006 | Miller | H05B 33/0815 345/204 |
| 2006/0244396 A1 | 11/2006 | Bucur | |
| 2007/0103947 A1* | 5/2007 | Taguchi | H02M 1/12 363/45 |
| 2007/0262724 A1* | 11/2007 | Mednik | H05B 33/0818 315/125 |
| 2007/0285027 A1 | 12/2007 | Gehman | |
| 2008/0094000 A1 | 4/2008 | Yamamoto et al. | |
| 2008/0203946 A1 | 8/2008 | Ito | |
| 2009/0230883 A1 | 9/2009 | Haug | |
| 2009/0028172 A1 | 11/2009 | Maschietto et al. | |
| 2010/0060189 A1 | 3/2010 | Stevens | |
| 2010/0109557 A1 | 5/2010 | Bouchard | |

FOREIGN PATENT DOCUMENTS

| | | |
|---|---|---|
| WO | 2006107199 A1 | 10/2006 |
| WO | 2007035883 | 3/2007 |
| WO | 2007121798 A1 | 11/2007 |
| WO | 2008041152 | 4/2008 |

* cited by examiner

LED BASED LIGHTING APPLICATION

FIELD OF THE INVENTION

The invention relates to LED based lighting applications, such as lighting applications that are supplied by a current driver that is powered by a varying supply voltage such as provided by a TRIAC dimmed electronic transformer.

BACKGROUND OF THE INVENTION

State of the art efficient and cost effective LED drivers are not dimmable in a retrofit situation secondary to electronic transformers e.g. in the case of being dimmed using a standard TRIAC dimmer. In general, an LED driver is understood as comprising a power converter such as a switching regulator or a linear regulator for powering an LED or assembly of LEDs and a control unit arranged to control the power converter and/or the LED assembly. LED drivers generally are powered from a DC input source where dimming of the light (in response to a user interface action) is typically realised by adjusting the duty cycle of the LED or LEDs of the application. As such, conventional LED drivers are not suited for being powered by a voltage source such as provided by a standard TRIAC dimmer. The reason being that the waveform after an electronic dimmer can vary substantially. As such, the instantaneous voltage available as input to the LED driver may be momentarily insufficient to power the LED or LEDs of the lighting application. A normal halogen light will average out the power received and will not be induced to flicker, although even with halogens, the low output levels are cumbersome and flicker is seen in many cases.

When conventional LED drivers are powered by a voltage source such as provided by a standard TRIAC dimmer, light flicker may equally occur when the current required by the LED driver falls below a minimum value of the holding current of the TRIAC. A standard TRIAC design may e.g. require a holding current (after firing each 100 Hz cycle in a 50 Hz mains frequency example) of between 30-50 mA. In order to ensure the required holding current when a voltage needs to be provided to the LED driver, it has been proposed in literature to provide a load in parallel to the LED driver in order to ensure that the minimum holding current is being supplied by the TRIAC dimmer. Maintaining such a current (in order for the TRIAC to maintain its conducting state) may result in an important dissipation, adversely affecting the efficiency of the lighting application.

Often, state of the art LED drivers to be powered from e.g. a mains AC supply, apply a comparatively large input filter capacitance (over 1 to 10 uF). Such capacitance can e.g. be applied after a unit for EMI filtering and rectification and before a power converter, e.g. an efficient switching regulator. There are some significant draw backs to a large (over 0.1 uF) capacitance in this location. The capacitor's size, weight, cost, reduced life expectancy, and its negative impact on Power Factor Correction (PFC) all lead to serious drawbacks in existing driver designs when the capacitor is significantly over 0.1 uF.

Another drawback of existing solutions is that significant size, weight, cost, reduced life expectancy of PFC circuitry is prohibitive for applying low power direct mains current drivers.

A further drawback of existing solutions is that in many cases the 100 Hz line frequency is found in the light output. For certain people a 100 Hz frequency may easily lead to nausea. In addition, moving the lighting application and the eyes of an observer relative to each other may lead to flicker and/or stroboscopic effects at such comparatively low frequencies.

It is an object of the invention to at least partially eliminate at least one of the above-mentioned drawbacks or to at least provide a usable alternative.

It is an object of the present invention to provide i.a. an LED based lighting application that is better suited for dealing with a power source differing from a DC power source.

SUMMARY OF THE INVENTION

According to a first aspect of the invention, there is provided a lighting application comprising
  an LED assembly comprising two or more LED units, each LED unit comprising one or more LEDs, the LED assembly further comprising a switch assembly comprising one or more controllable switches for modifying a topology of the LED assembly,
  a drive unit for powering the LED units, the drive unit, in use, being powered from a supply voltage,
  a control unit for controlling the drive unit, the control unit comprising an input terminal arranged to receive a signal representing the supply voltage, and an output terminal for providing a control signal to the switch assembly to control the switch assembly in accordance with the signal.

The lighting application according to the first aspect of the invention comprises two or more LED units, each LED unit comprising at least one LED. In accordance with the present invention, an LED is understood as including any electroluminescent diode that is capable of generating radiation in response to an electrical signal. An LED unit according to the invention may comprise one or more LEDs. In case an LED unit comprises more than one LED, the LEDs may be connected in series or in parallel or a combination thereof. The LED units as applied in the lighting application according to the invention are arranged in a serial connection.

The lighting application according to the first aspect of the invention further comprises a switch assembly for modifying a topology of the LED assembly. As an example of such a modification, short circuiting one or more of the LED units can be mentioned. The switch assembly can e.g. provide each LED unit with a controllable switch for substantially short-circuiting the LED unit. The switch assembly may, as an example, comprise a FET or MOSFET connected in parallel with one or more of the LED units. By controlling a state of the FET or MOSFET, (i.e. conducting or non-conducting), the one or more LED units may be short-circuited. In accordance with the invention, modifying the topology of the LED assembly is understood to include, but not being limited to:
  connecting or disconnecting one or more LED units such that they are no longer powered by the drive unit;
  short-circuiting one or more LED units such that a supply current from the drive unit flows through a parallel path to the LED unit and no longer through the LED unit itself;
  modifying how the LED units are interconnected.

As an example of the latter, changing a series connection of two LED units of the LED assembly to a parallel connection of the LED units can be mentioned.

The lighting application according to the first aspect of the invention further comprises a drive unit for providing power to the LED units. Within the meaning of the present invention, a drive unit is also referred to as a converter or power converter. As an example, the drive unit may comprise a buck converter or a boost converter. Such a converter can convert an input power source (e.g. a supply voltage from a dimmer circuit) to an appropriate current source for powering one or more LED unit. Converters such as a Buck or Boost converter are examples of switching regulators. It is worth noting that the drive units as applied in the lighting applications or LED drivers according to the various aspects of the present invention can also be linear regulators such as voltage or current regulators. The use of such linear regulators is often discouraged because of a poor efficiency in case of an important mismatch between the supply voltage and the required load voltage. In accordance with an aspect of the present invention, the topology of an LED assembly can be modified based on a signal representing the supply voltage. By doing so, a better match between the supply voltage and the required load voltage can be realised, as will be illustrated in more detail below. As such, in a lighting application according to the present invention, a linear regulator can be applied in a more efficient way. As an example, a rectified AC mains voltage (e.g. 230 V, 50 Hz) can be used as a supply voltage for a linear regulator powering an LED assembly. Assuming each LED unit of the LED assembly to have a forward voltage of approx. 4 V and a minimal voltage drop of the regulator being 1.5 V, the control unit controlling the switch assembly can modify the LED assembly topology by adding a series connected LED unit to the LED assembly when the voltage difference between the supply voltage and the load voltage (i.e. the voltage over the LED assembly) exceeds 5.5 V. When the supply voltage reduces and the voltage difference approaches 1.5 V, one of the LED units can e.g. be short-circuited, e.g. by closing a switch of the switch assembly by the control unit. As an alternative, the topology can be changed by connecting LED units in parallel rather than in series.

When and how to change the LED assembly topology can be determined by the control unit based on a signal representing the supply voltage, in general representing a property of the supply voltage. The signal can e.g. represent the difference between the supply voltage and a required load voltage, e.g. the required forward voltage over the LED assembly.

In an embodiment, the signal can, as an alternative, represent the load current as provided by the power converter to the LED assembly.

As a result of the described way of controlling the LED assembly topology (and thus the required load voltage) by appropriate switching of the switch assembly, the losses in the regulator will approx. vary between 1.5 times the applied current and 5.5 times the applied current.

In accordance with the first aspect of the invention, the lighting application further comprises a control unit for controlling the switch assembly. The control unit can be implemented in various ways such as with dedicated hardware, using one or more microprocessors or digital controllers that are programmed using software. The control unit as applied in the present invention may also be implemented as an FPGA or an FPGA with a soft-core processor or as an analogue or digital controller.

The control unit as applied in the lighting application according to the invention is arranged to control the switch assembly based on a signal representing the supply voltage (or one or more characteristics, e.g. a voltage level, of the supply voltage) as applied to the drive unit (i.e. the power converter (e.g. a Buck converter) of the lighting application). As an example, the control unit may determine a maximum number of LED units or which LED units that can be powered (e.g. based on the available supply voltage and information regarding the required forward voltage of the different LED units) and control the switch assembly in accordance. The signal representing the supply voltage (or one or more characteristics of the supply voltage) can be derived directly from the supply voltage provided to the drive unit or may be derived from a different access point on the lighting application. The lighting application according to the invention can e.g. be powered from a mains AC power supply. In such case, the AC power supply may undergo various transformations prior to being used as a supply voltage to the drive unit. Such transformations may e.g. include an actual transformation to a different voltage level, a rectification by a rectifier, filtering, reduction via a dimmer circuit such as an external TRIAC dimmer circuit. In between such transformations, the voltage can be accessed and can be used to derive a signal representing the supply voltage of the drive unit from.

The lighting application according to the first aspect of the invention thus facilitates the application of a varying voltage source as a supply voltage for a drive unit for powering two or more LED units. In case the supply voltage as provided to the drive unit drops below a required value for powering all LED units when connected in series (i.e. the required forward voltage over the serial connected LED units), the control unit can e.g. determine the maximum number of LED units that can be powered at the same time and control the switch assembly to short circuit one or more LED units to secure that the required forward voltage can be provided by the supply voltage. Instead of short circuiting one or more LED units, changing the interconnecting of the LED units from a series connection to a parallel connection can be considered as well. In order to comply with a requirement of providing a certain average light intensity, a momentarily lower intensity, due to a reduced supply voltage, can be compensated later by providing an increased intensity.

As such, the lighting application according to the first aspect of the invention is particularly suited for retrofit applications. At present, different types of lighting applications are applied in e.g. domestic environments. Such applications e.g. include light bulbs which can e.g. be supplied directly from an AC mains power supply (e.g. 230V, 50 Hz) or a dimmed AC supply (e.g. an output voltage from a TRIAC dimmer). Other known lighting applications are e.g. supplied from a comparatively low AC voltage (e.g 12 V or 24 V) which can equally be dimmed. Known lighting applications also include light sources powered by a DC voltage or a DC voltage having an AC component superimposed to it. The lighting application according to the present invention can be powered from a variety of power sources as the lighting application is arranged to adjust the effective number of serially connected LED units (and thus the required forward voltage of the serially connected LED units) based on the momentarily amplitude of the power supply voltage that is available. The lighting application according to the present invention can thus be supplied from an output voltage of a dimmer circuit such as a TRIAC dimmer.

In an embodiment, the control unit as applied in the lighting application is arranged to determine a dimming level from the supply voltage. As explained in more detail below, this can be accomplished in different ways; The required light intensity (or dimming level) can e.g. be determined from an average value of the dimmer output signal. The lighting application can e.g. be arranged to assess such average value and provide a signal representing such average value to the control unit. The control unit may, in response to the signal, control the switch assembly to obtain the required light intensity.

As an alternative, the dimming level can be determined or estimated from a duty cycle at which a switching element of the drive unit or power converter (assuming a switching regulator is applied) is operating. As will be explained below, the duty cycle of such a switching element can vary depending on the difference between the available supply voltage (e.g. a dimmer output voltage) and the required load voltage. As such, the observed duty cycle or a signal representing this duty cycle may equally be applied to control the topology of the LED assembly.

In an embodiment, the lighting application according to the invention further comprises a rectifier for rectifying the dimmer output voltage and outputting the rectified voltage as a supply voltage for the drive unit.

In an embodiment, the lighting application comprises a waveform analyser arranged to assess the supply voltage and/or any internal voltage and provide the signal (i.e. the signal representing a voltage level of the supply voltage) to the control unit. Such a waveform analyser can e.g. comprise an A/D converter for converting a signal representing the supply voltage. The waveform analyser may e.g. comprise one or more comparators for determining a voltage level of the supply voltage. The waveform analyser can e.g. be arranged to determine a zero crossing of the supply voltage. As such, the waveform analyser may facilitate a synchronisation between a periodic supply voltage (e.g. a (rectified) AC voltage or TRIAC dimmer output voltage) and the control signals of the control unit as applied in an embodiment of the lighting application according to the first aspect of the invention, Note that a one-to-one correspondence between the supply voltage (input for the drive unit) and the required forward voltage may require some scaling: relevant for the determination of the (number of) LED units that can be powered is the output voltage that can be generated by the drive unit given a momentary supply voltage. This output voltage can e.g. be somewhat smaller than the supply voltage (e.g. due to voltage drops inside the drive unit, . . . ).

When supplied from an AC power source, the input AC wave form (or the wave form that is outputted by an (electronic) transformer such as a dimmer) can, in an embodiment of the present invention, be used by the LED driver to synchronise a number of control and feedback methods (e.g. by the control unit) that allow for a cost effective, power efficient, dim-able, and retrofit-able LED driver.

As known to the skilled person, in order to change an intensity of an LED or change the colour of the light generated by an LED assembly, the duty cycle at which the LED is operated can be altered. As an example, when an LED is provided with a current during 25% of the time (i.e. operating at a 25% duty cycle), the intensity of the light is reduced to substantially 25%. In practice, the on and off cycling of the current (resulting in either generating light or not) can be performed at a sufficiently high frequency such that it becomes unnoticed by a person. In order to achieve this, in general, a duty cycle period is predetermined and the required duty cycle is applied within said period. Within the meaning of the present invention, the term 'duty cycle period' is used to denote the period over which a required duty cycle is applied. As an example, a duty cycle of 25% can be realised in a predetermined duty cycle period of e.g. 4 ms by providing a current during 1 ms and subsequently turning off the current during 3 ms and repeating this process. By selecting the duty cycle period sufficiently small and thus having a sufficiently high frequency content for the current, no intensity variations will be observed by the human eye. In this respect, it is worth noting that the ON and off times of the duty cycle need not be continuous within the duty cycle period as meant here. See, for example, WO 2006/107199 for a more elaborate build-up of the ON time within the duty cycle period. In general, the applied duty cycle period is predetermined and e.g. based on the possible (minimal) pulse width of the current that can be provided and/or the resolution required. Assuming a current pulse having a duration of 2 microsecond or a multiple thereof can be generated, the selection of a duty cycle period of 4 ms would then allow the intensity to be varied in 2000 steps between full intensity and zero intensity. In case an LED assembly is powered from a substantially constant power source (e.g. a DC power supply), the selection of duty cycle period can be done arbitrarily and varying the duty cycle period slightly would not affect the illumination as observed.

However, when an LED assembly is powered from a periodic supply voltage, it has been observed that a particular selection of the applied duty cycle period with respect to the period of the supply voltage can provide certain advantages. In order to avoid aliasing effects due to the interaction of the frequency content of the supply voltage and the duty cycle modulation as e.g. applied by the control unit to the LED assembly, it has been found that a duty cycle period should be selected such that the division of the supply voltage period by the duty cycle period results in an integer number.

As such, according to an embodiment, the control unit is arranged to apply a duty cycle modulation to the LED assembly by controlling the switch assembly, whereby the duty cycle modulation is applied with a duty cycle period selected such that a division of a supply voltage period by the duty cycle period results in an integer number.

As an example, for 50 Hz applications (the period of the rectified voltage being 10 ms), the duty cycle period can be selected to be 5 ms, for 60 Hz applications (the period of the rectified voltage being 8.333 ms), the duty cycle period can be selected to be 4.165 ms. In a yet preferred embodiment, the duty cycle period is selected such that the division of a first supply voltage period by the duty cycle period results in an integer number and the division of a second, different supply voltage period by the duty cycle period also results in an integer number. By doing so, the lighting application can be powered from power supplies with a different frequency while maintaining the advantages of avoiding aliasing effects. As an example, selecting the duty cycle period equal to 833 microseconds results in both the 50 and 60 Hz period being so divisible by the duty cycle period. By selecting a duty cycle period as indicated, the switching of the switch assembly enabling the duty cycle modulation becomes in fact synchronised with the supply voltage.

In accordance with the invention, the switch assembly (i.e. one or more switches such as MOSFETs, FETs, GTOs, IGBTs or the like that are controlled by a control unit) can serve two purposes:
- the switches can either be applied to modify the topology of an LED assembly as described above, and/or,
- the switches can enable the LED units of the LED assembly to operate at a desired duty cycle thus obtaining a duty cycle modulation of the current through the LED units, e.g. PWM or the like.

As explained in more detail below, the lighting application according to the first aspect of the invention may further comprise additional modules such as an EMI filtering module, a Power Factor Correction (PFC), an input filter to the LED driver optionally including a (switchable) buffer and an output filter optionally including a (switchable) buffer arranged (i.e. electrically connected) between the LED driver and the LED assembly of the lighting application.

The first aspect of the invention can also be implemented without the use of a specific drive unit such as switching regulator or a linear regulator. As such, according to the first aspect of the invention, there is provided a lighting application comprising an LED assembly comprising two or more LED units, each LED unit comprising one or more LEDs, the LED assembly further comprising a switch assembly comprising one or more controllable switches for modifying a topology of the LED assembly, the LED assembly, in use, being powered from a supply voltage, a control unit for controlling the switch assembly, the control unit comprising an input terminal arranged to receive a signal representing the supply voltage or a load current to the LED assembly, and an output terminal for providing a control signal to the switch assembly to control the switch assembly in accordance with the signal, thereby modifying the topology of the LED assembly.

In such an embodiment, the LED assembly can directly be coupled to the supply voltage, whereby the topology of the LED assembly can be adjusted or modified depending on the available voltage. By changing the way the LED units are interconnected (e.g. either in series or in parallel), the required load voltage (i.e. the forward voltage required by the LED unit or units) can be altered and adjusted in accordance with the available supply voltage.

In an embodiment of such a lighting application, the control of the switch assembly is based on a signal representing the supply voltage. Such a signal can e.g. be a digital signal proportional to the instantaneous amplitude of the supply voltage. As an alternative, the signal could e.g. indicate when a certain voltage level occurs. The signal could thus e.g. be a pulsed signal comprising a pulse when the supply voltage equals zero. Such a signal can e.g. be applied in case the supply voltage is a periodic voltage with a fixed frequency and amplitude. As such, the notion when a certain voltage level occurs (e.g. a zero-crossing) can be sufficient for a control unit controlling the switch assembly to determine how to modify the topology. As an example, in case the supply voltage is a rectified 230V, 50 Hz AC mains voltage, the control unit can determine at any instance the available voltage when e.g. the instance of zero voltage is known. Based on the available voltage, the control unit can control the load (i.e. the LED assembly) such that the required load voltage substantially matches the supply voltage.

It is worth noting that, when relying on a voltage measurement in order to determine when and how the LED assembly topology should be modified, measures are preferably taken to limit or control the current as provided to the LED assembly. As will be understood by the skilled person, the current vs. forward voltage characteristic of an LED is very steep beyond a certain forward voltage over the LED. In order to avoid excessive currents which could damage the LED, a current limiter or current limiting measures as known in the art can be implemented in the lighting application.

In another embodiment of such a lighting application, the control unit controls the switch assembly based on a signal representing a load current to the LED assembly. As will be understood by the skilled person, when an LED is provided with a voltage above its nominal forward voltage (e.g. 4 V), an important increase of the current through the LED can be observed. Equally, when an LED is provided with a voltage below its nominal forward voltage (e.g. 4 V), an important decrease of the current through the LED can be observed. As such, the current as provided to the LED assembly, provides a clear indication of the relationship between the available voltage and the required load voltage. As such, the control unit can control the switch assembly accordingly and thus change the LED assembly topology. As an example, the control unit can control the switch assembly to add a series connected LED unit to the LED assembly when the load current increases above a certain level and to short-circuit an LED unit (or modify the interconnection of an LED unit from being series connected to parallel connected) of the LED assembly when the load current drops below a certain level (both levels can either be different but could also be the same).

Controlling the switch assembly based on a signal representing the load current to the LED assembly can be advantageous as it provides a more direct approach to determining whether or not to add or remove a LED unit, in general, modify the LED assembly topology, compared to e.g. assessing a difference between the supply voltage and the load voltage and control the switch assembly using this difference.

The load current as applied to control the switch assembly (via the signal representing the load current) can either be the total current provided to the LED assembly or the current provided to one or more of the LED units. In case the total load current is used to control the switch assembly, the actual topology (in case two or more LED units are operating in parallel) of the LED assembly may need to be taken into account. As such, the level (or levels) used to trigger a change in topology may need to take the number of parallel branches of the LED assembly into account to assess whether the current supplied to the LED units is above or below a certain level.

As adding or removing LED units to or from the LED assembly (due to a change in topology of the LED assembly) can affect the load current provided to the LED assembly and can thus cause current variations, the present invention proposes different measures to mitigate the current variations.

As an example, the duty cycle at which the LED units are operated can be adjusted such that brightness variations due to load current variations are mitigated. As an example, the duty cycle can be gradually reduced in case the load current increases above the nominal current thereby maintaining the brightness substantially constant. Such an adjustment of the duty cycle can e.g. be realised by appropriate control of the switch assembly or, when applied, the drive unit for powering the LED units.

As a further example, current variations can be mitigated by applying the voltage difference to charge a capacitor prior to adding a series connected LED unit (when the supply voltage increases) and discharging the capacitor to maintain the voltage over the LED assembly when the supply voltage decreases.

The first aspect of the invention further provides a method of powering an LED assembly by an LED driver connectable to a power source, the LED assembly comprising a serial connection of two or more LED units, each LED unit being provided with a controllable switch for short-circuiting the LED unit, the method comprising the steps of detecting a voltage output level of the power source, compare the voltage output level to a required voltage for powering the LED units to determine a maximum number of LED units that can be powered by the power source, control the switches of the LED units in accordance with the maximum.

The method for powering an LED assembly according to the first aspect of the invention enables to power an LED assembly taking into account the available supply voltage of a power source. As explained in more detail below, further constraints such as a colour or intensity set point can be taken into account as well. Therefore, in an embodiment, the method further comprises the step of adjusting a duty cycle of the LED units in accordance with the voltage output level while maintaining a colour set point. As explained in more detail below, to accommodate for a reduced input voltage, the LED assembly topology can be adjusted. By adjusting the duty cycles of the LED units (thereby e.g. reducing the intensity of the light output) a colour set point can e.g. be maintained, even at a reduced voltage output level.

The method of powering an LED assembly according to the first aspect of the invention can be generalised to a method of powering an LED assembly connectable to a power source, the LED assembly comprising two or more LED units, the LED assembly further comprising a switch assembly comprising one or more controllable switches for modifying a topology of the LED assembly, the LED assembly, in use, being powered by the power source, the method comprising the steps of detecting a voltage output level of the power source,
providing a control signal to the switch assembly to control the switch assembly based on the voltage output level, thereby modifying the topology of the LED assembly.

In an embodiment, the method, as described above, can be applied to power an LED assembly by a power source via an LED driver such as a switched or linear regulator.

In an embodiment, the switch assembly includes switches for short-circuiting the LED units.

In the lighting application according to the first aspect of the invention, i.e. a lighting application comprising multiple LED units the power factor can be improved by utilising multiple LED units and reducing the required converter output voltage (which is determined by the forward voltages of the different LED units) by, temporarily, closing a switch over one or more LED units. By doing so, a larger portion of an AC input voltage can be applied for powering the converter. Preferably, the operation of the switch assembly is synchronised with the supply voltage (e.g. an AC voltage or TRIAC dimmer output voltage). Such a synchronisation can include, as mentioned above, an appropriate selection of the duty cycle period.

According to a second aspect of the invention, there is provided an LED driver for powering an LED assembly that is suited for being supplied from a dimmer circuit such as a TRIAC dimmer. The LED driver according to the second aspect of the invention comprises a converter for converting a periodic input voltage to a supply current for powering the LED assembly, the LED driver further comprising a control unit arranged to determine a minimal holding current by, in use, gradually reducing the supply current until a value of the input voltage substantially reduces to zero and subsequently control the converter to operate at a supply current at least equal to the minimal holding current.

When an LED driver is being powered by a TRIAC dimmer or the like, it is important to ensure that the TRIAC remains in a conductive state during the time an output voltage needs to be provided. Such a TRIAC dimmer may e.g. convert an AC input voltage to a suitable (reduced) periodic input voltage (e.g. by phase or angle modulation) for conversion to the supply current. In order to provide such a periodic input voltage, it may be required to maintain the TRIAC in a conductive state. As will be acknowledged by the person skilled in the art, in order to maintain a TRIAC in a conductive state after triggering, a minimum current, also referred to as the holding current, should pass through the main terminals of the TRIAC. When the power demands of the LED assembly are such that the current as provided by the TRIAC dimmer is lower than the minimum value, the TRIAC leaves its conductive state. As a consequence, the input voltage as provided may become equal to zero. The LED assembly according to the second aspect is arranged to ensure that, when a certain supply voltage is required by the LED driver, the LED driver load is such that a sufficiently high current is supplied by the dimmer to ensure the supply voltage being provided.

In an embodiment, the LED driver according to the second aspect of the invention is applied in a lighting application, the lighting application comprising an LED assembly comprising at least one LED, the lighting application further comprising a variable load, in use controlled by the control unit, the variable load being connected in series with the LED assembly.

As an example, the variable load can comprise a resistor and a controllable switch (such as a FET or MOSFET) for short circuiting the resistor. Similar to the LED or LEDs of the LED assembly, the resistor can be operated at a certain duty cycle thus requiring a certain amount of power from the LED driver. When the LED assembly (e.g. comprising a serial connection of a plurality of LED units such as the LED assembly as applied in the lighting application according to the first aspect of the invention) is operating at a certain duty cycle (e.g. the LED units of the assembly operating at a certain duty cycle corresponding to a (user defined) set point of intensity and/or colour), a certain amount of power needs to be provided by the LED driver to the LED assembly. In order to supply this power to the LED assembly, this power needs to be received by the LED driver, e.g. from a TRIAC dimmer circuit. The LED driver according to the second aspect of the present invention is arranged to determine, based on a voltage measurement at the input terminals of the LED driver, whether the power requested by the LED driver is sufficient to maintain a TRIAC of the dimmer circuit in a conductive state and, based on the voltage measurement, adjust the load characteristic of the variable load.

In order to determine the required variable load for maintaining a TRIAC of the dimmer circuit in a conductive state, a current vs. voltage characteristic can be determined e.g. during part of the periodic input voltage of the LED driver. Based on the characteristic, a minimum power (and current) can be determined in order to maintain the TRIAC in a conductive state.

The LED driver according to the second aspect of the invention enables a substantially continuous assessment of the required (load)current to maintain a TRIAC dimmer that can be used to power the LED driver in an operating (conducting) state. As such, the LED driver is capable to, almost instantaneously, adapt to varying operating conditions and can ensure an optimal (a.o. with respect to efficiency) operation of the LED driver.

In an embodiment, the load characteristic of the variable load as provided in the LED driver is varied during part of the periodic input voltage of the LED driver while the voltage at the supply terminals is monitored. When the load is varied to such an extent that the voltage at the terminals drops to zero, the load as presented by the LED driver is too small to maintain the TRIAC in a conductive state. Based on this, a control unit can determine a minimum load requirement for maintaining the TRIAC in a conductive state.

In an embodiment, a substantially continuous assessment of the minimum required holding current for maintaining a TRIAC of an external dimmer in a conductive state can be obtained. As such, the LED driver is capable of substantially continuously setting an optimal load current (i.e. a current sufficient to provide the required lighting output and sufficient to maintain the TRIAC in a conductive state.

In an embodiment, a trailing end of the periodic input voltage is used to make the above mentioned load vs. voltage analysis. The outcome of the analysis can be applied during a subsequent period of periodic input voltage to set the required LED assembly load and variable load. When assessing the minimal holding current in a trailing end of the periodic input voltage, the impact on the light intensity is comparatively small or non-existent, as is explained in more detail below.

In an embodiment, the control unit of the LED driver according to the second aspect of the invention is arranged to 1. control the converter to reduce the supply current
2. measure a value of the input voltage at the reduced supply current
3. repeat steps 1 and 2 during subsequent periods of the input voltage until the supply voltage substantially reduces to zero,
4. controlling the converter to increase the supply current during a subsequent period.

In order to power an LED unit, the LED driver according to the second aspect of the present invention comprises a converter (e.g. a Buck or Boost converter) for converting an input voltage to a supply current for powering the LED unit. Such an LED unit comprises at least one LED but may equally correspond to an LED assembly as applied in the lighting application according to the first aspect of the invention. The converter as can be applied in the LED driver according to the second aspect of the invention can e.g. correspond to a drive unit (or power converter) as e.g. applied in the lighting application according to the first aspect of the invention. So, either a switching regulator or a linear regulator could be applied.

As will be acknowledged by the skilled person, maintaining a certain holding current may result in an important power dissipation in the converter. In order to mitigate such dissipation, the LED driver according to the second aspect of the invention comprises a control unit that enables to find, e.g. in an iterative manner, which supply current is required to maintain the input voltage. It can be noted that the minimum holding current may vary substantially, depending on the operating temperature of the TRIAC. At −40 C., a minimum holding current of approx. 30-50 mA may be required, while at +25 C. an average TRIAC only requires 5-10 mA. In order to determine a minimum value of the supply current (required to maintain the input voltage), the control unit of the LED driver is arranged to control the converter to reduce the supply current and to measure a value of the input voltage at the reduced supply current. As long as the input voltage is maintained, the supply current is sufficient to maintain the converter from providing the input voltage. The control unit is further arranged to repeat the steps of controlling the converter to reduce the supply current and to measure a value of the input voltage at the reduced supply current until the input voltage substantially reduces to zero, e.g. due to a TRIAC aborting it's conductive state.

In an embodiment, the minimum holding current can be determined substantially without being visually detectable as flicker. At the end of a period of the input voltage (e.g. synchronised to the line phase) a test can be performed to lower the supply current even further while keeping the overall holding current at a higher level with a hysteresis for stability. Only losing power for a small part of the supply voltage period is something that can be corrected by a marginally bigger input capacitor (<5%).

In an embodiment, an input capacitance is provided to the LED driver according to the second aspect of the present invention. Such an input capacitance can be applied as a buffer for providing a supply voltage to the LED driver when the supply voltage is comparatively low. Such a capacitance may equally serve as a filtering element.

In an embodiment of the LED driver according to the second aspect of the invention, a comparatively small input capacitance can be provided before the power converter by making use of a non-linear transfer curve between the supply voltage (e.g. provided by a TRIAC dimmer) phase cut and the output level: When a TRIAC dimmer is provided to power an LED driver, an angle modulated AC voltage can be provided as the supply voltage. By applying a non-linear relation between the angular modulation of the dimmer and the light output, e.g. a zero degrees phase cut resulting in 100% of the nominal light while an 90 degrees phase cut resulting in only 30% of the nominal light (rather than 50% of the nominal light), the input capacitance supplying the LED driver when the supply voltage is comparatively low (or substantially zero due to the angle modulation) the capacitance can be almost a factor of 2 smaller. The user experience while dimming would remain substantially unaffected by such a non-linear implementation, as the typical TRIAC dimmer has no scale and users operate a dimmer "until satisfied with the result".

In an embodiment, the LED driver according to the second aspect of the invention comprises an input buffer, e.g. a switchable capacitor, as explained in more detail below.

In such an embodiment, it can be decided to limit the energy intake of an input buffer, e.g. a capacitance to the time it takes to fill a capacitor or other storage element to the extent that it can power the remaining part of the cycle (this can e.g. be obtained by application of a switchable storage element or buffer, as is explained in more detail below). This can be to the benefit of power efficiency.

When an input capacitance, in general a storage element or buffer, is applied to power the LED driver during part of a period of the supply voltage, it may be cumbersome to determine a required dimming level as the powering of the LED driver by the capacitance may result in a TRIAC of a dimmer dropping out of its conductive state i.e. without any additional measures, such an implementation may prohibit determining the dimming level since this information is lost because of the TRIAC switching off for lack of holding current.

In order to resolve this, in an embodiment of LED driver according to the second aspect of the invention, the control unit of the LED driver is arranged to maintain at least the minimal holding current during at least an entire period of the supply voltage, e.g. once every 5, 10 or 50 cycles. As an example, in case a 50 Hz AC voltage is provided as input for a TRIAC dimmer, and the dimmer output voltage is subsequently rectified by a full bridge rectifier, a supply voltage having a period of 10 ms is obtained. In this manner each 50, 100 or 500 ms the holding current (e.g. 50 mA) is maintained during an entire period thus enabling the actual dimmer setting to be determined while still gaining 4/5, 9/10 or 49/50 of the dissipation advantage of not having to hold the TRIAC current for an entire period of the supply voltage.

In an embodiment, the LED driver according to the invention is powered from an electronic transformer. In general, such an electronic transformer converts an input power source (e.g. an 230 V, 50 Hz mains supply) to a pulsed power supply, e.g. providing a pulsed voltage of 11.5 V at 35 kHz. In practice, a plurality of LED units or LED assemblies is often powered from a single electronic transformer. In such an arrangement, similar problems can occur with respect to loss of power (i.e. the transformer ceasing to provide power to the load) when the total power drawn by the plurality of LED assemblies descends below a minimum holding current of the electronic transformer. In general, an electronic transformer will attempt, when a certain period has expired, to output power again in case of a loss of power. Said period, e.g. 400 microseconds, may depend on the operating conditions prior to the loss of power. When the power drawn by the LED units or LED assemblies is too small, the output voltage of the electronic transformer can drop to zero. In order to maintain the output voltage of the transformer to the required voltage, the control unit of the LED drivers/units or lighting applications according to the invention can be arranged to increase the power consumption of the LED drivers, by adding an extra load. However, as it is a-priori unknown with how many LED assemblies (say in a case: N) the electronic transformer is loaded, the extra load may rise to N times the load which is minimally necessary for all types of electronic transformers to stay outputting power. This follows from the observation that such an extra load can only be determined at design-time of the LED driver and/or LED assembly. With certain types of load (f.e. capacitive), such a high load may damage the electronic transformer, thus limiting N to only 1 or 2 nodes. By making the LED driver adapting to the situation, that is to the number of LED assemblies N, a situation can be reached that only the bare minimum of extra load is added over the entire system (that is over all N LED assemblies) to keep the electronic transformer alive.

Assuming the additional bad needed to keep the electronic transformer operating to be a capacitor of X nF. In case more than one lighting application is powered from the transformer, it may be sufficient to add to each lighting application a load which is only a fraction of X nF, namely substantially 1/N times X nF. As N is a priori unknown, it is proposed according to the invention, to gradually increase the additional load whereby an assessment is made whether the added load is sufficient, each time a load, e.g. X/Y nF is added. Each time a load is added, the electronic transformer will, as indicated above, attempt to output power again. In case the load of the transformer is insufficient, the transformer will cease to output power indicating that further additions of the load are required. As such, it may typically take a few periods before the total added load by the N LED assemblies equals or exceeds the minimal extra load. As an example, assuming a minimal load requirement to be 15 nF whereby the load represented by each LED application can be increased in steps of 2 nF during each period. In such a situation, it would take three periods to obtain or exceed the minimal load when 6 LED assemblies are powered by the transformer. In case 10 LED assemblies are powered, it would only take one period to obtain or exceed the minimal load. As soon as the minimal load required is added, the lighting applications can stop adding load. Using this approach, one can avoid that the total load to be powered by the electronic transformer increases to a level that would cause damage to the electronic transformer.

According to a third aspect of the invention, there is provided an LED driver for powering an LED assembly comprising at least one LED, the LED driver comprising a converter for converting a periodic input voltage to a supply current for powering the LED assembly, the converter having input terminals for receiving the periodic input voltage, the LED driver further comprising an input buffer for providing a current to the terminals and a control unit, the LED driver further comprising a switching element for opening and closing a current path from the input buffer to the terminals and wherein the control unit is further arranged to control the switching element based on an input signal representing the periodic input voltage.

By applying an LED driver according to the third aspect of the invention, a significantly smaller input buffer (e.g. a capacitor) is enabled by only connecting the capacitor to the periodic input voltage, e.g. a rectified voltage when either the rectified voltage is higher than the current capacitor voltage value or the input voltage is too low to supply the power convertor, it is therefore coupled to the line input phase. Unlike the traditional filter capacitance e.g. applied with a rectifier, the LED driver according to the third aspect of the invention enables the capacitor's voltage to be kept high until the stored power is actually needed instead of the capacitor's voltage decreasing with the input voltage decreasing. Using this method, an input capacitor size can for example be reduced by a factor of 10.

In an embodiment of the LED driver according to the third aspect of the invention, the switching instances or moments of the power convertor are synchronised with the line phase. Due to the synchronisation a more reproduce-able LED current flow is achieved while EMI is reduced since the switch moment can be chosen optimal for this. In addition, since the 50, 60, 400 or 480 frequencies are very precise over multiple cycles, the synchronisation of all switching and feedback elements to the line phase in an intelligent mains voltage LED driver leads to a more stable light output regardless of temporary variations which are abundant on an average mains supply.

As an example of such a synchronisation, the selection of the duty cycle period relative to the supply voltage period as described above, can be mentioned.

In an embodiment, the input buffer as applied comprises a capacitor assembly comprising a plurality of capacitors and wherein the switching element is further arranged to control a topology of the capacitor assembly based on the input signal. As an example, the capacitor assembly comprises two capacitors whereby the switching element is arranged to connect the capacitors either in series or in parallel. By connecting the capacitors in parallel when charging, the charging can be done with a comparatively low voltage. When the charged capacitors are subsequently connected in series, a comparatively large voltage becomes available for powering the converter and thus the LED assembly. In order to modify the topology of the capacitor assembly or modify the interconnection of the capacitor assembly to either the periodic input voltage or the power converter, the switching element as applied in the LED driver according to the third aspect of the invention can comprise more than one switch. By controlling the switching element based on an input signal representing the periodic input voltage, it is possible to choose the time of connecting the capacitors for charging at times enabling drawing a current from the supply that is larger than the minimum current needed to keep an electronic transformer or a TRIAC dimmer alive during a needed amount of time. As such, by using several capacitors in a capacitor assembly, the charging of the capacitors can be performed at times when the power requirements of the load are insufficient to maintain an electronic transformer or a TRIAC dimmer providing an output power. As such, the capacitor or capacitor assembly as described, in general the input buffer, can be used as a variable load as applied in an embodiment of the LED driver according to the second aspect of the invention.

In another embodiment of the LED driver according to the third aspect of the invention, a smaller storage element or buffer (e.g. a capacitor) is enabled by introducing an on/off duty-cycle to the current provided by the LED driver to an LED assembly, the on/off duty cycle being synchronised with the supply voltage (e.g. an AC mains voltage or TRIAC dimmer output voltage). Preferably, the on/off duty cycle has a frequency content above 500 Hz to reduce flicker and nausea effects. The off-part of the duty-cycle can be chosen to align with the line phase where the capacitor is feeding the power convertor. Using this method, e.g. a 75% duty-cycle at 500 Hz would allow halving the capacitor in an example case.

In an embodiment of the LED driver according to the third aspect of the invention, the periodic input voltage which, in use, is applied to the converter (or drive unit) is a TRIAC dimmer output voltage. In such an arrangement, the control unit of the LED driver should be arranged to determine a required dimming level for the LED assembly in accordance with the TRIAC dimmer output voltage This can e.g. be done by determining an average value of the supply voltage over a predetermined period of time. Based on the determined dimming level, a set point can be determined by the control unit for powering the LED units (e.g. a duty cycle of the LED units) for obtaining the required dimming level.

In an embodiment, the required dimming level is derived from the available voltage at the end of a boost stage (i.e. a discharge stage or phase of the input buffer discharging its energy into the load, thus powering the load). This available voltage can be considered a measure for the average available voltage and thus of the required dimming level.

As an alternative, the required dimming level can be derived from the operation of the converter. This can be illustrated as follows: assuming the converter as applied in the LED driver is a switched mode power supply such as a Buck or Boost converter. Such a converter is, in general, controlled to maintain a substantially constant output current for powering the LED assembly. In order to maintain such a constant output current, a switching element of the converter will operate at a certain duty cycle. In case the input voltage of the converter would change, this change would affect the duty cycle of the switching element. A larger input voltage would require the switching element to operate at a smaller duty cycle in order to maintain the output current. This mechanism can be applied to adjust the brightness of an LED assembly in the following way. Rather than maintaining the output current to a substantially constant level, the converter of the LED driver according to the invention is controlled in such way that a switching element of the converter is operating at a substantially constant duty cycle or within a duty cycle range. An increase of the input voltage would lead to a smaller duty cycle of the switching element. By, in response to such a smaller duty cycle, setting the brightness set point higher (and/or change the topology of the LED assembly), the power drawn from the regulator/drive unit is increased causing the duty cycle to increase again. So by changing the set point of the brightness (and thus the dimming level), the duty cycle can be kept substantially constant, and the dimming level observed will follow the incoming average voltage level and thus the TRIAC dimmer setting.

In such an embodiment, no additional hardware such as an ADC (analogue to digital converter) for providing a signal to the control unit representing the input voltage is needed.

Generalising this principle, the duty cycle at which a switch of the power converter of the LED driver is operating, can be considered a measure for the available supply voltage or the difference between the available supply voltage and the required load voltage and can thus be applied to control the topology of the LED assembly, by controlling the switch assembly.

In another embodiment of the LED driver according to the third aspect of the invention, a smaller capacitor is enabled by introducing a current-setting duty-cycle whereby the current supplied to the power converter by the capacitor during part of the input voltage period is lower than the current supplied when the capacitor is not discharged to the power converter. Phrased differently, the control unit of the LED driver can be arranged to control the LED driver to apply a reduced current to the LED assembly when the LED assembly is powered from the input buffer. Using this method a reduction of the input buffer (e.g. a capacitor) of up to 30-40% can be achieved without negative impact to visible flicker. Preferably the current setting is coupled to the line input voltage. In such an arrangement, in order to maintain a certain brightness, a larger current or an increased duty cycle can be applied when the power converter is not supplied from the buffer.

In another embodiment of the LED driver a significantly smaller input capacitor is enabled by charging a larger capacitance at the output of the power convertor which can be discharged when the rectifier output voltage is insufficient for the power convertor. In an additional embodiment, the voltage stored is doubled by a diode/capacitor network before being used.

As mentioned above, the switchable input buffer can e.g. comprise a capacitance or an inductance. By combining both in an LED driver, the LED driver can be arranged to operate as either a substantially capacitive load or a substantially inductive load. By alternating operating the LED driver as a capacitive load, e.g. during multiple periods of the input voltage (thereby applying the capacitance as input buffer) and as an inductive load e.g. during multiple periods of the input voltage (thereby applying the inductance as input buffer), the power factor of the LED driver can be adjusted and improved. In case multiple LED drivers are applied, e.g. in a lighting application comprising multiple LED assemblies, each powered by an LED driver, a power factor compensation or adjustment can be realised by applying both LED drivers having a capacitive buffer and LED drivers having an inductive buffer.

In an embodiment, the LED driver according to the third aspect of the invention comprises an EMI filter comprising a filter capacitor connected to the terminals, in parallel to the switched input buffer. In an embodiment whereby the input buffer comprises a capacitor connectable to the terminals by the switching element, an additional switch is provided in a conductor between the filter capacitor and the capacitor. By appropriate operation of the additional switch such that the capacitor is not charging the filter capacitor, an improved behaviour with respect to audible noise and EMI can be obtained as is explained in more detail below. Applying the switch in a ground wire or conductor rather than in a live wire, the control of the switch can be facilitated.

Further details and advantages of the LED drivers and lighting applications according to the present invention are provided in the description below.

DESCRIPTION

Figure 1A:
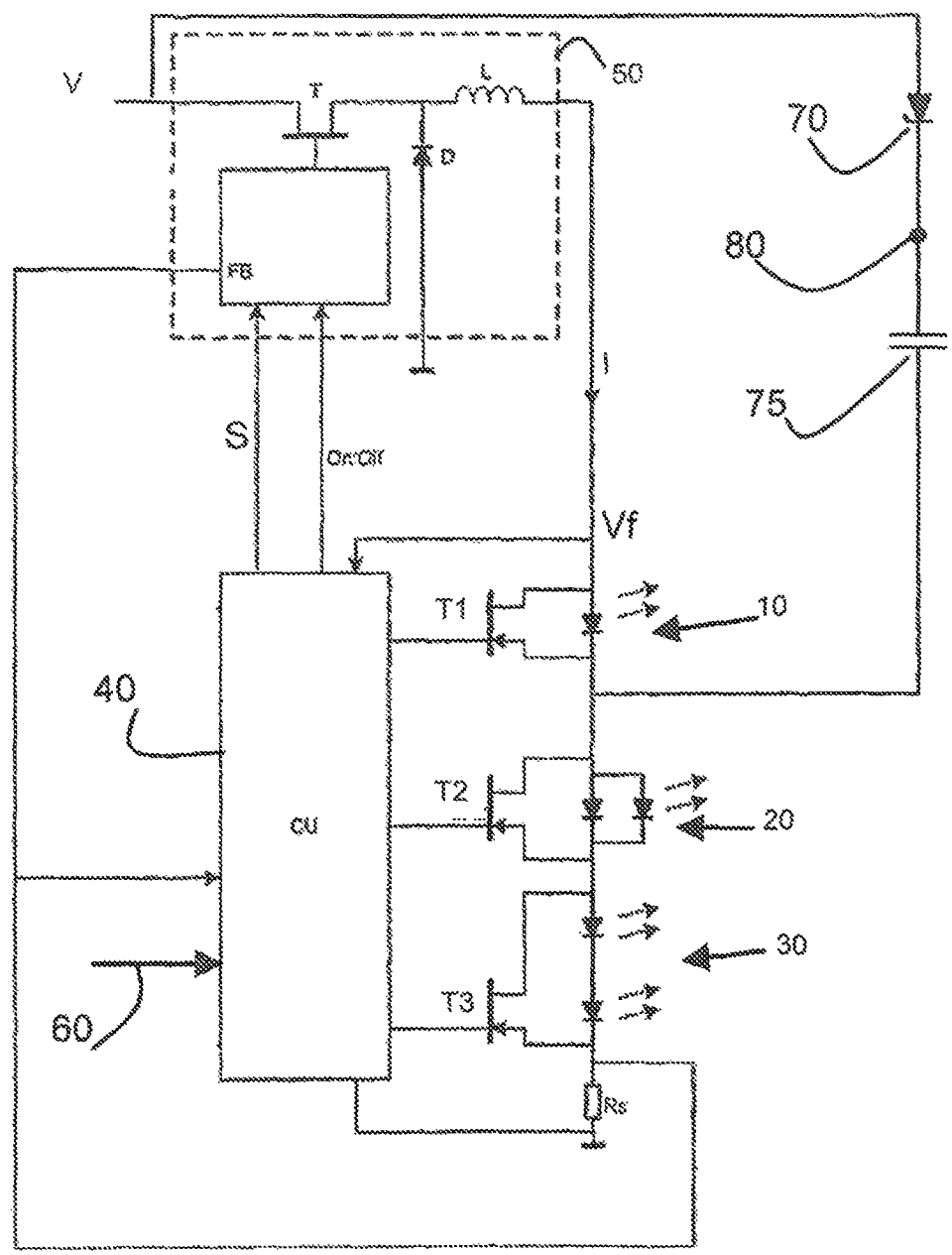
FIG. 1a schematically depicts a first embodiment of the lighting application according to the first aspect of the invention.

The present invention provides, in a first aspect, a lighting application comprising a plurality of serial connected LED units which can e.g. be powered from a dimmer output signal, in general, from a power supply source. FIG. 1a schematically depicts a first embodiment of the lighting application according to the invention. FIG. 1a schematically depicts a serial connection of three LED units 10, 20 and 30. The embodiment further comprises a switch assembly comprising three switches T1, T2 and T3 that can substantially short circuit the respective LED units 10, 20 and 30. The switches can e.g. comprise a FET or a MOSFET. FIG. 1a further depicts a drive unit (also referred to as power converter) 50 for powering the LED units and a control unit 40 for controlling the drive unit 50. The drive unit can e.g. be, as shown in FIG. 1a, a buck converter or can be another type of converter that enables the application of a current I to the LED units. The drive unit 50 is supplied from a voltage source V. In general, such a buck converter is supplied from a substantially constant DC voltage. When the supply voltage V is not constant (e.g. comprising an AC component), the supply voltage may, at some instances, be insufficient to power the LED units as the LED units each require a certain forward voltage Vf. In order to enable the application of a varying supply voltage as input for a drive unit for an LED based lighting application, the lighting application according to the invention is provided with a switch assembly and is arranged to provide a signal 60 to the control unit 40, the signal representing the supply voltage V that is provided to the converter 50. The signal 60 can e.g. represent a property of the supply voltage V such as a voltage level or a zero-crossing instance or can e.g. the voltage difference between the supply voltage V and the load voltage Vf. As shown in FIG. 1a, the control unit 40 can further be equipped to provide an On/Off signal to the converter 50 in order to turn the current source on or turn it down. The control unit 40 may further be arranged to control the switching element T of the converter by providing a control signal S to the drive unit 50. Also a voltage over resistance Rs (representing the current through the LED assembly) can be applied as a feedback to the control unit 40 and to the converter 50 (inputted at a terminal FB of the converter) and can be applied to control the switching element T of the converter or the switch assembly.

The signal 60 as provided to the control unit and representing at least a property of the supply voltage V can be applied by the control unit to determine a required dimming level (e.g. in case the supply voltage originates from a TRIAC dimmer circuit). This can e.g. be done by determining an average value of the supply voltage over a predetermined period of time. Based on the determined dimming level, a set point can be determined by the control unit for powering the LED units (e.g. a duty cycle of the LED units) for obtaining the required dimming level. In this respect, it is worth noting that in some lighting applications which comprise multiple light sources such as LED assemblies, it is considered important that each light source provides at the same intensity and/or the same colour. In order to achieve this in a lighting application comprising multiple LED assemblies, it is thus important that each LED assembly is operated at substantially the same set point for intensity and/or colour. As the required set point is e.g. derived from an input signal (e.g. signal 60 as shown in FIG. 1a), it may occur that due to tolerances, the control units of the multiple LED assembly derive a different set point from the input signal. In order to overcome this, it can be arranged to assign a set point (either an intensity or colour set point) corresponding to the input signal when the input signal is within a certain bandwidth or margin. It will be clear to the skilled person that, by doing so, a trade-off is made between the resolution that can be realised with respect to colour and/or intensity and the requirement to have the same output with respect to colour and/or intensity. It can further be noted that this way of deriving a set point for an intensity and/or colour of an LED assembly may also be implemented in control units as applied in LED drivers according to the second or third aspect of the invention.

As an alternative, it can be arranged that the control unit of one of the LED assemblies operates as master and derives an intensity and/or colour set point of the input signal representing the supply voltage and provides the set point to the other control units controlling the other LED assemblies of the multiple LED assemblies. By doing so, an improved resolution of the intensity and/or colour can be maintained while ensuring that the same set point is applied by all LED drivers associated with the multiple LED assemblies.

The switch assembly allows changing the topology of the serial connected LED units by short circuiting one or more of the switches T1, T2 and T3. In the embodiment as shown, each LED unit can be shorted by turning on an appropriate switching element, which can e.g. be controlled by the control unit 40, thereby effectively lowering the minimum voltage input Vf required by the drive unit 50 to still provide a current to the remaining LED units. In order for the control unit 40 to determine the number of LED units that can be powered, the control unit 40 is arranged to receive a signal representing the available voltage for powering the LED units. Such a signal can e.g. be obtained directly from the drive unit input voltage V. Based on the available voltage for powering the LED units and the required voltage by the different LED units, the control unit can determine which topology or topologies can be powered by the available voltage. The control unit may then control the switching assembly in such manner (e.g. by controlling the switches that bridge the LED units) that the required topology is obtained. Reducing the number of LED units that are on in the low voltage ranges of the supply voltage V of the drive unit 50 allows e.g. a buck convertor to support a larger range of the supply voltage, especially interesting for (temporarily) lowering required output voltage depending on available input voltage.

The embodiment as shown in FIG. 1a further comprises a diode 70 and capacitor 75 connected between the supply voltage V and the LED assembly. In FIG. 1a, the capacitor is connected to a node between the LED units 10 and 20 but may equally be connected between other LED units or connected to ground. As will be acknowledged by the skilled person, the capacitor 75 as implemented can be charged by the supply voltage V. As such, it provides a voltage source that, in case the supply voltage V is small or zero (in case the supply voltage e.g. comprises an AC component or comprises a rectified AC voltage or a TRIAC dimmer output voltage) can be applied for various purposes. The available voltage can e.g. be applied to drive the switches T1, T2 and T3 in case the supply voltage V is too low. The available voltage can also be applied as a supply voltage for the control unit. As the control unit, only requires a small operating current (~1 mA), a comparatively small capacitor may suffice to temporarily supply the control unit when the supply voltage V is too low. When a comparatively large capacitor 75 is applied, the stored energy may even be sufficient to power the LED units during a certain period when the supply voltage V is too low.

The embodiment as shown in FIG. 1a and the embodiments discussed further on can, optionally, be provided with a rectifier or a rectifier element. Such a rectifier can rectify the incoming AC waveform (i.e. the dimmer output voltage) thereby e.g. generating a pulsed DC waveform that can be used to supply the drive unit of the lighting application. In its simplest form it consists of a single diode which then leads to a single phase output with a large off-period. A further embodiment can e.g. comprise a diode bridge comprising 4 diodes that use both AC phases and can lead to a fully rectified output. Due to the minimum forward voltage drops the diodes cause some current and voltage distortion and also account for some dissipation. Most of the dissipation and distortion can be removed by using low voltage drop switching elements (e.g. FETs) instead of the diodes. In applications using a comparatively small voltage (e.g. 12 or 24 V AC), the application of switching elements may provide an important gain in available voltage.

In an embodiment, the lighting applications as depicted in FIG. 1a comprise a linear regulator as a drive unit instead of a switching regulator such as the Buck converter shown. Due to a comparatively low efficiency of such a converter, it is important to maintain the difference between the supply voltage V and the load voltage Vf as small as possible. The switch assembly as applied in the present invention can be used for this. Based on the signal 60, the control unit CU can determine an optimal configuration for the LED assembly such that a mismatch between the supply voltage V and the load voltage Vf is as small as possible.

Figure 1B:
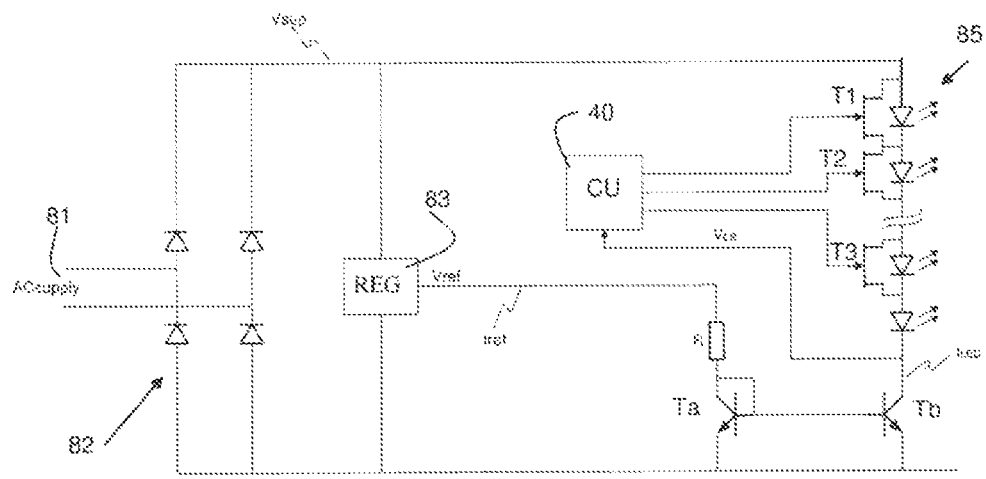
FIG. 1b schematically depicts a second embodiment of the lighting application according to the first aspect of the invention.

In an embodiment, the drive unit of the lighting application further comprises a so-called current mirror combined with a linear regulator. Such an arrangement is schematically depicted in FIG. 1b. FIG. 1b schematically depicts an AC supply voltage 81 connected to a rectifier 82 thus obtaining a supply voltage Vsup. The arrangement further comprises a regulator REG 83 arranged to supply a current Iref to one side of the current mirror 84 comprising two transistors Ta and Tb in a well-known mirror arrangement. Using such an arrangement, the current lied through the LED assembly 85 can be controlled to the same value as Iref. FIG. 1b further shows a control unit 40 (comparable to the control unit as shown in FIG. 1a) receiving a feedback signal Vce representing a voltage difference between the supply voltage Vsup and the voltage over the LED assembly 85. This feedback signal can be applied by the control unit 40 (in a similar manner as described with respect to FIG. 1a) to control the switch assembly comprising controllable switches T1, T2 and T3.

Figure 2A:
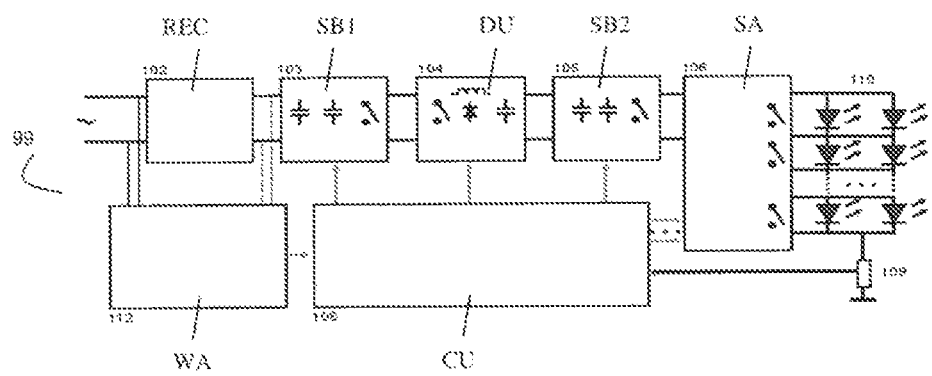
FIG. 2a schematically depicts a third embodiment of the lighting application according to the first aspect of the invention.

FIG. 2a schematically depicts another embodiment of the lighting application according to the first aspect of the invention. The lighting application as shown comprises an LED assembly 110 comprising a plurality of LED units and a switch assembly SA 106 arranged to, a.o. short circuit one or more of the LED units, in general, modifying the topology of the LED assembly, as discussed above. The embodiment further comprises a controller (or control unit CU) 108 arranged to control the switch assembly 106 and the power converter (or drive unit DU) 104 that, in use, powers the LED assembly 110. Reference number 99 denotes, in general, the voltage as provided to the lighting application. As such, it can e.g. correspond to an AC mains voltage or a dimmer output voltage (e.g. a TRIAC dimmer output voltage).

In an embodiment, the lighting application can comprise an EMI Filter (100) which can be applied to comply, if required, with legislature requirements on EMI, common-mode, and differential mode filtering. When switching effects of the power convertor (104) are not strong enough to require attenuation of the signal level to meet regulatory emission requirements, it can be omitted. Such an EMI filter can e.g. comprise an inductor and capacitor (LC) filter to suppress a switching frequency of the power convertor 104. In an earthed situation, a common mode choke can be used e.g. consisting of two distinct coil windings on a single core in combination with a small capacitance. Various examples of EMI filters both for earthed and non-earthed situations are known and can be applied in a lighting application or in combination with an LED driver as provided by the invention.

In the embodiment of the lighting application as shown in FIG. 2a, the lighting application further comprises a waveform analyser WA 112. Such a waveform analyser 112 is intended to provide information on the available voltage to the controller 108. Such information may e.g. relate to the voltage level available and/or the timing when the voltage is available. As an example, such a waveform analyser can e.g. sample the available voltage at a certain rate and store the information, e.g. after an A/D (analogue to digital) conversion. The waveform data may also be retrieved via a comparator, e.g. a comparator having multiple levels thus retrieving information when a certain voltage level is exceeded or not. In an embodiment, such a waveform analyzer can e.g. enable a synchronisation between the supply voltage that is provided as an input voltage to the drive unit or to the rectifier and the control unit thereby enabling the control unit to synchronise its control actions with the available input voltage. As an example, the waveform analyser can, preferably over multiple cycles, determine an as accurate as possible synchronisation of the control unit to the supply voltage, e.g. to the line and/or (electronic) transformer frequency. This can for example be done by (software) PLL locking to compensate for cycle-local line voltage distortions. The control unit may then e.g. base its control moments in time on the line phase detection. In an embodiment, the waveform analyser is arranged to detect a zero crossing of the dimmer output voltage. By doing so, a synchronisation between the dimmer output voltage and the control unit controlling the drive unit can be realised. As an example, the dimmer output voltage as can be applied to power the drive unit can e.g. correspond to an AC voltage which is dimmed using a TRIAC based dimmer and rectified. In order to know which voltage is available at a given moment in time, the available voltage can be sensed by the waveform analyser and a zero crossing can be detected. The waveform analyser may further be arranged to provide a synchronisation signal to the control unit based on the detected zero crossings. In case of a TRIAC based dimmer, the firing times of the TRIAC (which can e.g. be expressed by a modulation angle) may further provide information regarding the available voltage for powering the LED units. When the dimmer input voltage is known (e.g. 230 V, 50 Hz), a detection of the zero crossings and information regarding the applied modulation angle may provide sufficient information to the controller or control unit 108 to determine/predict, at any given time, the available voltage. As an alternative to the application of zero-crossings to synchronise the control unit 108 operation with the supply voltage, a detection of a peak value (or top value) of the supply voltage can equally be applied. Such peak value detection can e.g. be implemented by sampling the supply voltage (e.g. by using an A/D converter), storing the results of n (e.g. 10) latest samples and determining whether a peak value is observed within the n samples.

In the example as shown, the prediction of the available voltage relies, to a certain extent, on the voltage shape (e.g. a sinusoidal shape) being preserved when the TRIAC is conducting. In case the dimming action results in a less predictable voltage shape, the available voltage for powering the LED units can e.g. be derived in the following manner. In addition to or as an alternative to the detection of the zero crossings, the waveform analyser 112 can be arranged to register and store the waveform into a memory unit. When the waveform has been stored, the waveform analyzer 112 may thus provide the control unit 108 with information of one or more of the previous cycles. The waveform analyser 112 can e.g. store in a memory unit where in time which voltage was available (e.g. as a time-voltage curve or table) which can be used to determine which moments in time are effective in the next cycle to use for actual power supply to an LED assembly having a particular LED topology (which may e.g. be adjusted based on the assembly forward voltage requirements). Based on such a time-voltage curve or table, the control unit 108 can determine the maximum number of LED units that can be powered or which LED units can be powered at a given time. It will be appreciated that such an arrangement does not pose any limitation on the waveform shape provided that the voltage should have a substantially repetitive nature. In case of a rectified (e.g. by a full bridge rectifier) AC voltage that is subsequently altered by a dimmer circuit, the dimmer output voltage may e.g. have a substantially non-sinusoidal shape but still periodically; the waveform may e.g. repeat at a 100 Hz rate in case of a 50 Hz AC input voltage. In order to determine the rate of repetition of the waveform, the detection or determination of zero-crossings of the supply voltage can e.g. be applied.

In general, the waveform analyser 112 provides information on the available voltage to the control unit 108, in order for the control unit to determine which and/or how many LED units can be powered.

The information on the waveform can be retrieved from a number of access points on the lighting application. Depending on the access point applied, the information that can be retrieved may vary. As an example, in case only zero-crossings of the voltage available to the LED units need to be determined, these zero-crossing can e.g. be determined from the input voltage of the drive unit or, in case a rectifier REC 102 is applied, even from the voltage 99 that is supplied to the rectifier, e.g. an AC mains or TRIAC dimmer output voltage.

In an embodiment, the lighting application is provided with a filter causing a delay between the dimmer output voltage and the drive unit input voltage. Such a delay, e.g. provided by a filtering capacitance, can be applied to determine the voltage available to power the LED units in advance.

The waveform analyser 112 can e.g. acquire an input voltage of a transformer with some limited filtering (to reduce input capacitance) in one 100 Hz (or 120 Hz, or 400 Hz, etc.) cycle and map the input voltage to an appropriate voltage and current domain to be used in the next 100 Hz cycle: e.g. by determining for each 1 ms the voltage available of a 12 V AC output, an rms voltage between 0 and 12 V is found. The next cycle in that particular 1 ms period the maximum # of LEDs that can be powered by the available voltage level can be turned on. In this manner the output voltage (of the converter 104) may substantially follow the available input voltage over time with some margin. This may provide in a, for the human eye stable light output at comparatively low input capacitor values, thus avoiding the use of electrolytic capacitors which tend to be comparatively big, costly, and have a limited life time.

In the embodiment shown, the lighting application may further comprise an input filter and a switched buffer SB1 103 as indicated in FIG. 2a. Such optional element may serve to supply the drive unit (or power converter) 104 when an output voltage of the dimmer circuit or the rectifier has fallen below a minimum level usable for the drive unit (104). The optional input filter may comprise a fixed input filter, operating as a buffer, which can be connected directly to the rectified voltage. The embodiment as illustrated may further comprise a secondary (optional) buffer arranged to momentarily connect a buffer element (e.g. a capacitance) to the rectified voltage thereby charging the buffer and, at a later time, connect the buffer element to the input of the drive unit (also referred to as the power converter 104) thereby discharging the buffer in order to supply power to the power convertor when the rectified voltage has fallen too low. Further details and embodiments of such a switched buffer are disclosed below. The advantage of providing a switchable buffer is to save the stored high voltage in the buffer for optimal use at the time it is needed. The timing of connecting and disconnecting such a switchable buffer can be done autonomously by e.g. always accepting charging and saving discharging only when the input voltage of the power convertor 104 drops below a minimum level. A preferred embodiment however would e.g. enable the controller (108) to control the (dis)-connecting of the switchable element and e.g. synchronise the (dis)-connection with a line phase thus enabling a more robust buffer charging during each power cycle independent from momentary distortions of the line voltage. The buffer (or storage) element normally comprises a capacitor but can also take the form of an inductor.

The drive unit 50 (of the embodiment of FIG. 1a) or the drive unit 104 (of the embodiment of FIG. 2a) as applied in the lighting application according to the invention can e.g. be a buck regulator out of cost, efficiency and size considerations, but can also consist of a buck-boost, boost, SEPIC, CUK, etc., or any multiples or any combinations thereof. Instead of a switching regulator such as a Buck or Boost regulator, a linear regulator can also be applied as a drive unit 50.

The embodiment of the lighting application as shown in FIG. 2a may further, optionally, comprise an output filter and switched buffer SB2 105. The optional output filter can be used to reduce current and voltage ripple to the connected LED load, i.e. the LED assembly 110 and can e.g. comprise a capacitor. The optional switched buffer is an energy storage element that can be used to store energy during sufficient rectified voltage being available and can be tapped during the interval that the rectified voltage is not sufficient. The stored energy can be fed back to the input of the power convertor 104 when needed.

In an embodiment, the drive unit switching element or elements (e.g. switch T of the drive unit 50 of the embodiment as shown in FIG. 1a) can e.g. be synchronised to the line phase under control of the controller (108) and can e.g. comprise FETs, bipolar transistors, etc. The drive unit may use capacitors or inductors as storage elements that are switched. The power convertor may be direct off-line (not galvanically isolated) or galvanically isolated by e.g. a flyback transformer and accompanying switching element.

The control unit or controller (108) is the component of the lighting application that, based on a supply voltage based input signal (e.g. provided by the waveform analyser (112)) may align its control actions relative to the actual line phase. To enable this, the input signal to the controller may e.g. comprise synchronisation information such as the timing of the zero crossings of an AC input voltage. The controller or control unit 108 may optionally control the switched buffer 103 and thus enable a reduction of the buffer and filter capacitor's size: Constraints on the controlling of the switched buffer and the required available supply voltage can be applied as design input data to e.g. choose the capacitor size. This is explained in more detail below. The controller 108 may optionally control the power convertor 104 to reduce light output flicker caused by momentary line voltage fluctuations, it can (optionally) also set an on/off duty-cycle over time for the converter. The controller 108 may optionally control the output switched buffer (105) to allow storing energy when the supply voltage is sufficiently high for use when the voltage is insufficient to power the LED assembly. The controller 108 may also control the LED topology switches or switch assembly 106 to set a mix-colour point, or reduce an input voltage requirement of the power convertor 104 by reducing the # of LED units on. This is e.g. achievable by substantially short circuiting one or more of the LED units (by the switch assembly 106) thereby reducing the required forward voltage of the LED assembly 110. In the embodiment as shown in FIG. 2a, the controller 108 may take as input a feedback value 109 that may be use to achieve a light output colour and/or brightness set point. The controller 108 may furthermore be given a software algorithm such that it optimises power efficiency, light output or colour stability, and sufficient power factor correction. The controller 108 may use the waveform analyser's 112 data on a previous cycle waveform voltage data to set & optimise power conversion for the next cycle. The feedback 109 may give the controller 108 feedback on the actual light output and/or colour and may e.g. comprise a current sensing resistor or other method of measuring current. Another embodiment would be an optical feedback using an LED and photodiode as feedback in e.g. a galvanically isolated flyback convertor. Another embodiment would be to use direct light output feedback from a suitably mounted photo diode or other optical sensor.

In an embodiment, the control unit 108 can further be arranged to determine an average of the dimmer output voltage. Such average may e.g. be applied by the control unit to determine a set point for the intensity to be realised by the lighting application. In a retrofit application of the present invention (where a conventional lighting application is replaced by a lighting application according to the present invention), this can be applied to mimic the response of the replaced lighting application to a dimmer action. When a filtering is applied to the dimmer output voltage, the filtered voltage may directly be applied as a signal representing the average dimmer output voltage and may thus be applied to determine an intensity set point for the lighting application.

The LED assembly 110 as shown in FIG. 2a can e.g. be a network of serial connected LED units wherein each LED unit can comprise parallel and/or serially connected LEDs.

In an embodiment, the waveform analyser 112 may continuously analyse the incoming, e.g. (electronic) transformer's output, waveform in order to recover a line frequency (with the purpose of synchronising a controller 108 to it) and may also determine over a (synchronised) e.g. 10 ms supply voltage period (in case of 50 Hz) when and which number of LED units can be powered by the drive unit 104, e.g. a buck convertor.

The application of a waveform analyser 112 that can retrieve and store information on a previous cycle waveform voltage and supplies the information to a controller 108, can facilitate the controller in controlling both the intensity and colour as generated by the lighting application.

According to the present invention, there is also provided an embodiment of an LED based lighting application which is more directly supplied from an AC or periodic supply voltage. Rather than using a power converter or drive unit such as a switched mode power supply or a linear regulator, the lighting application according to the embodiment comprises an LED assembly comprising two or more LED units, each LED unit comprising one or more LEDs (such as LED units T1, T2 and T3 as shown in FIG. 1a) whereby the LED assembly is powered from a period voltage, e.g. a rectified AC voltage. The LED assembly further comprising a switch assembly comprising one or more controllable switches for modifying a topology of the LED assembly and a control unit comprising an input terminal arranged to receive a signal representing a voltage level of the supply voltage or a load current of the LED assembly, and an output terminal for providing a control signal to the switch assembly to control the switch assembly in accordance with the signal, thereby modifying the topology of the LED assembly.

Instead of electrically connecting a power converter between a supply voltage (e.g. voltage V as shown in FIG. 1a) and the LED assembly, the LED assembly is powered from the supply voltage without the use of such a converter. Instead, the control unit of the lighting application is arranged to adjust the topology of the LED assembly such that the load voltage substantially matches the supply voltage. Compared to the arrangement shown in FIG. 2a, the power converter 104 can thus be omitted. In order to control the switch assembly and thus controlling the load voltage, the control unit can receive, similar to the arrangements shown in FIG. 1 or 2, a signal representing the supply voltage (e.g. a rectified AC voltage) and control the switch assembly based on this signal.

As a more direct approach, the control unit can rely its control operations on a signal representing the load current, i.e. the current provided to the LED assembly. Based on the current provided to the LED assembly, i.e. the load current, the control unit of the lighting application can determine how the topology of the LED assembly should be. As an example, the LED assembly can comprise a serial connection of n LEDs, each LED being provided with a parallel switch enabling a short-circuiting of the LED (as e.g. shown in FIG. 1a), whereby the LED assembly is e.g. powered from a rectified AC voltage. Starting from an instance whereby the supply voltage is substantially zero, 1 LED can be switched on (by opening the switch of the switch assembly that is parallel to the LED. By doing so, a current will flow through the LED according to the well-known forward voltage (Vf) vs. current (I) characteristic of an LED. When the available supply voltage exceeds the nominal Vf of the LED, an important increase of the current through the LED (according to the Vf vs, I characteristic) can be observed. The current through the LED can e.g. be derived from a feedback signal e.g. originating from a sense resistor, such as resistor Rs in FIG. 1a. A signal representing the load current (i.e. the current through the LED) could also be derived from an optical sensor as the intensity of the light generated can be considered a measure for the current through the LED. Based on the signal representing the load current, the control unit of the lighting application can e.g. in case the current exceeds a certain value, control the switch assembly to open a switch in parallel to a second LED thereby obtaining two series connected LEDs. As a result, the available voltage will be distributed over both LEDs resulting in a reduced load current. Continuing this process, the control unit can e.g. control the load current to remain within a certain bandwidth by adding or removing LEDs to/from the LED assembly.

As will be understood by the skilled person, adding or removing an LED as described can result in an important current variation when only a few LEDs are operated. In order to mitigate this, in an embodiment, the LEDs or LED units of the LED assembly are provided with a parallel capacitor which can be switched on or off by a switch connected in series with the capacitor.

Figure 2B:
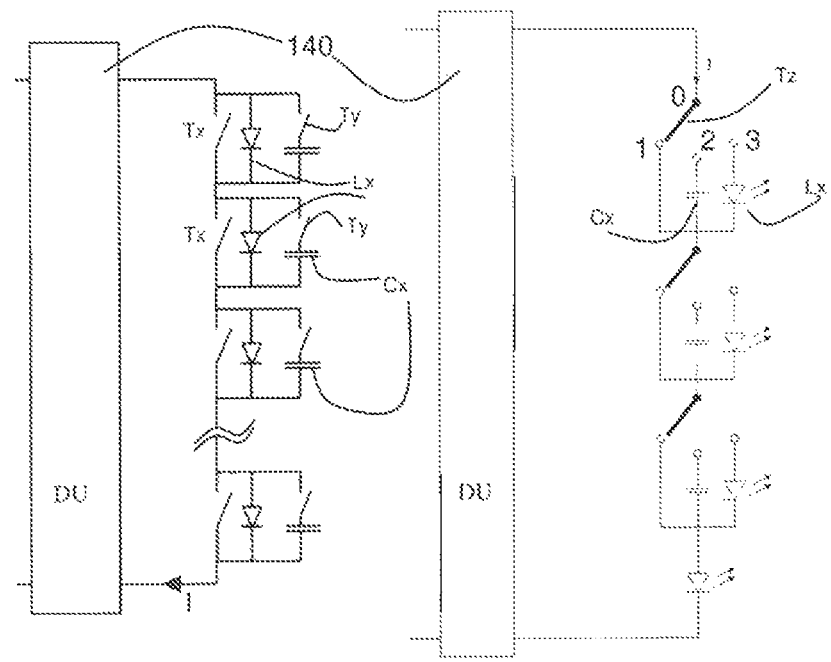
FIG. 2b schematically depicts two possible arrangements of an LED assembly directly powered from a rectified supply voltage.

FIG. 2b schematically depicts two possible arrangements enabling the current variations due to adding or removing LEDs to be reduced. In the arrangement shown on the left of FIG. 2b, the LED current is controlled by a switch Tx in parallel to the LEDs. The LEDs Lx are further provided with a capacitance Cx which can be connected in parallel to the LEDs by operating switches Ty. In such an arrangement, by closing switch Ty of the LED which is to be added, the capacitor in parallel to the LED is charged. Switch Tx is assumed to be opened at the same time as Ty. By doing so, the voltage over the LEDs already operating can be maintained substantially constant despite an increase of the supply voltage, by appropriate dimensioning of the capacitors Cx. Phrased differently, the voltage over the capacitor can be designed to increase (due to the charging of the capacitor) with substantially the same slope as the supply voltage increases. As such, the voltage over the LEDs already operating can be maintained substantially constant. Once the capacitor has been charged to e.g. the Vf of the LED to be added, the capacitor can be switched off, i.e. switch Ty can be opened. During a decrease of the supply voltage, the charge stored in the capacitor can be applied to, in a similar manner, maintain the voltage over the operating LEDs or LED units substantially constant. An alternative arrangement is shown on the right of FIG. 2b, whereby a switch Tz is provided for connecting an LED Lx, which can either connect a terminal 0 to either terminal 1 (thereby disconnecting the LED Lx), terminal 2 (thereby connecting a capacitor Cx) or terminal 3 (thereby connecting the LED Lx). When the switch Tz is connecting terminal 0 to terminal 1, LED Lx is not provided with a load current. In case the available supply voltage increases, the switch Tz of an LED Lx to be added is operated to, in a first step, connect terminal 0 to terminal 2 thereby charging the capacitor Cx. Similar to the arrangement on the left, charging the capacitor can result in the voltage provided to the operating LEDs to remain substantially constant. Once the capacitor is charged, e.g. to the forward voltage Vf of the LED to be connected, switch Tz can be operated to connect terminal 0 to terminal 3, substantially without causing any current variations.

It is worth noting that the application of the switchable capacitors as illustrated in FIG. 2b can also be applied in combination with a power converter or drive unit DU as applied in the other lighting applications according to the invention.

Figure 3A:
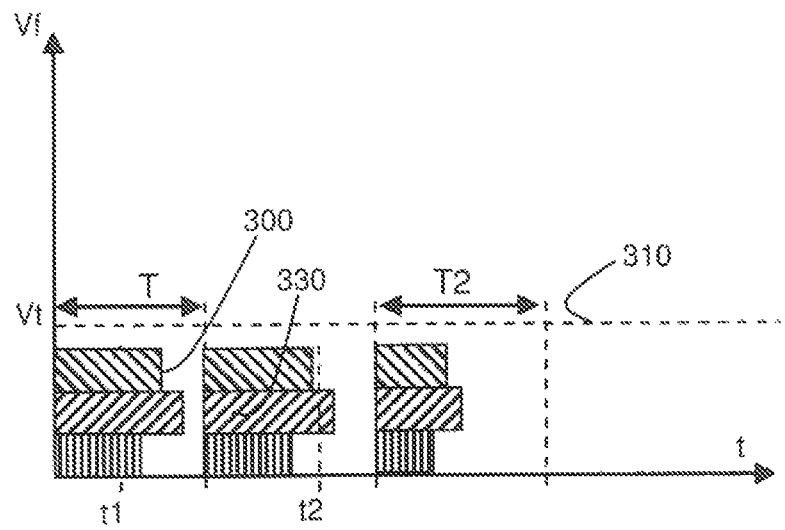
FIG. 3a schematically depicts the required forward voltage when three LED units are powered at different duty cycles, as a function of time.
Figure 3B:
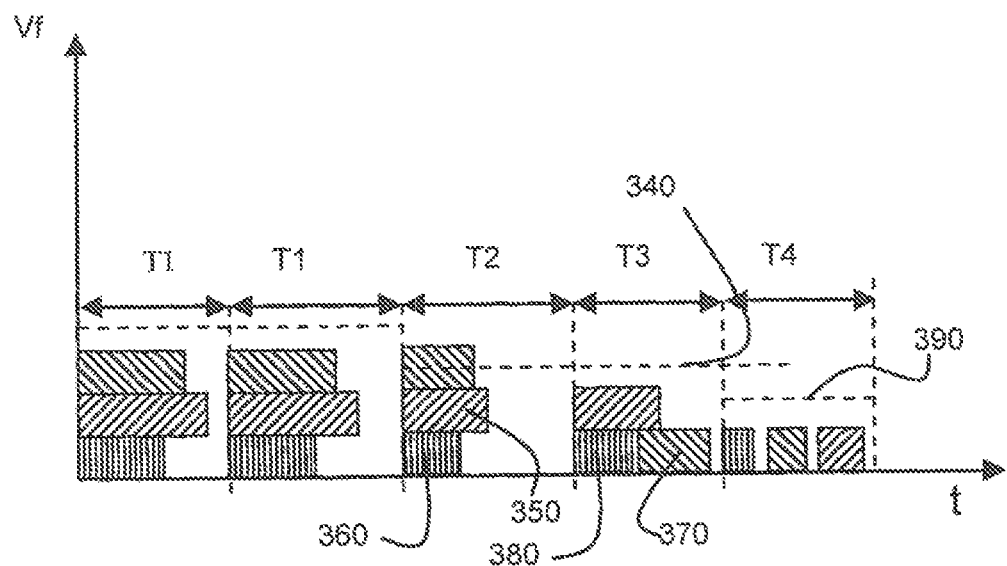
FIG. 3b schematically depicts how to power a plurality of LED units when a variable supply voltage is available.

In an LED based application, a colour set point is, in general, realised by operating a plurality of LEDs having a different colour (e.g. a red, a green and a blue LED) each at a specific duty cycle such that, on average, the colour set point is obtained. When a substantially constant supply voltage is available, which is sufficient to power the serial connection of LED units, a controller or control unit may easily determine the required duty cycles of the different LED units. When the supply voltage is sufficient to power all LED units at the same time, the supply voltage does not pose a limitation to the application of the different duty cycles. When however, e.g. due to the application of a dimmer, the supply voltage as provided to the drive unit, is at some instances, too low to power all LED units at the same time, the control unit may need to take the available voltage into account when determining at which instances which LED units are powered. This is illustrated in the following FIGS. 3a-3b, schematically depicting operating sequences of multiple LED units using a duty cycle modulation, e.g. PWM or the like. Assuming an LED assembly comprising three LED units, each comprising one LED of a different colour. In order to provide, on average, a predetermined colour set point, the LED units are operated at a different duty cycle, e.g. determined by a control unit. FIG. 3a schematically depicts when the three LED units are powered, indicated by the required forward voltage Vf of the LED units, as a function of time t. The operation of the LED units is indicated by rectangular shaped blocks, e.g. block 300, wherein the width of the block corresponds to the time an LED unit is powered and the height of a block represents the required forward voltage for providing a current to the LED unit. As can be seen, in order to operate the LED units at a specific duty cycle, the LED units are only operated part of each period T, also referred to as the 'duty cycle period'. Within the meaning of the present invention, the term 'duty cycle period' is used to denote the period over which a required duty cycle is applied. The duty cycle periods Ti as shown in FIGS. 3a and 3b can, in general, be selected in an arbitrary manner and could even be varied during operation.

Figure 4:
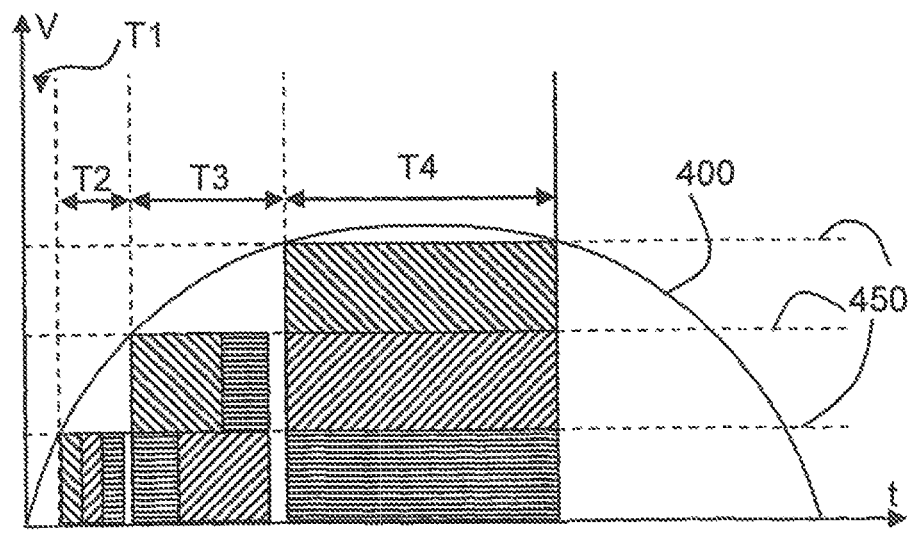
FIG. 4 schematically depicts how a plurality of LED units can be powered by a substantially sinusoidal voltage.

It has been observed however that, in case a periodic supply voltage is available, it may be advantageous to synchronise the switching operations of the switch assembly controlling the topology of the LED assembly with the periodic supply voltage. Such a synchronisation can advantageously be achieved by selecting the duty cycle period such that a period of the periodic supply voltage divided by the duty cycle period results in an integer value. As an alternative, in case the duty cycle period is not constant (as e.g. illustrated by periods T2, T3 and T4 as indicated in FIG. 4), a sequence of successive duty cycle periods should form a pattern which is synchronised with the period of the supply voltage. By synchronising the duty cycle period with the period of the supply voltage, aliasing effects can be reduced.

By operating the LED units at a specific duty cycle, a specific colour set point can be realised. When the three LED units are powered at the same time, the sum of the required forward voltages of the LED units should be available. As such, at t=t1, the supply voltage needs to be larger than the sum of the forward voltage of the three LED units (i.e. Vt). At t=t2, only the forward voltage of the LED unit indicated by block 330 needs to be available. The supply voltage available for powering the LED units is schematically indicated by the dotted line 310. When the intensity of the lighting application needs to be reduced, while maintaining the colour set point, the duty cycles of the LED units can e.g. be reduced proportionally. In case a substantially constant supply voltage is available, the reduced intensity can be realised by operating the LED units as indicated during period T2.

In case a variable supply voltage is available, powering the LED units may not be possible in the same manner. This is illustrated in FIG. 3b. The left part of FIG. 3b (covering periods indicated by T1) substantially corresponds to the left part of FIG. 3a. During period T2, a reduced intensity is required, due to the lower available supply voltage, while maintaining the same colour set point. (it can be noted that the human eye is more sensitive to short colour variations than to intensity variations.) Due to a reduction of the supply voltage, indicated by the dotted line 340, the supply voltage available during period T2 is less than the sum of the forward voltages of the three LED units. Phrased differently, during period T2, the three LED units cannot be powered at the same time. It will be clear that solving this by merely powering only the LED units indicated by blocks 350 and 360 would affect the colour that is generated. In order to operate the lighting application at the reduced intensity and maintaining the colour set point, the LED units can be powered with the required duty cycle, but sequential powering of the LED units may be required. This is illustrated during period T3 of FIG. 3b: As can be seen, rather than powering the three LED units at the start of period T3, only two units are powered, the third unit (indicated by block 370) is powered, at the appropriate duty cycle, when the first unit (indicated by block 380) is no longer powered. As such, the reduced intensity can be realised while maintaining the colour set point. As will be clear to the skilled person, a further reduction of the available supply voltage (e.g. indicated by dotted line 390 during period T4) may result in the requirement that only one LED unit can be powered at the same time. In such a situation, the powering of the three LED units can e.g. be as indicated during period T4 of FIG. 3b. In general, such a sequential powering of the different LED units within a certain period rather than powering the LED units simultaneously should be feasible since the required duty cycles of the different units can be reduced, i.e. to mimic the effect of a reduced supply voltage of a conventional lighting application on the intensity of the lighting application. In order to maintain substantially the same colour output, the duty cycles of the different LED units can be reduced proportionally. So, in order to respond to changed dimmer output voltage (i.e. due to a user action on a dimmer in order to reduce the light intensity), the control unit may reduce the duty cycle of the LED units thus realising a reduced light intensity. Operating the different LED units at reduced duty cycles enables the powering of the LED units in a more sequential manner (see the operation during periods T3 and T4) rather than powering the LED units at the same time. By operating the LED units in a sequential manner, the voltage requirement for powering the LED units is reduced.

It may further be noted that an average light intensity over multiple periods T can e.g. be maintained by compensating for a reduced intensity in periods having a comparatively low supply voltage in periods having a comparatively high supply voltage.

Regarding the selection of the duty cycle period or periods as applied, in a preferred embodiment, the duty cycle period is selected such that the division of a first supply voltage period by the duty cycle period results in an integer number and the division of a second, different supply voltage period by the duty cycle period also results in an integer number. By doing so, the lighting application can be powered from power supplies with a different frequency while maintaining the advantages of avoiding aliasing effects. As an example, selecting the duty cycle period equal to 833 microseconds results in both the 50 and 60 Hz period being divisible by the duty cycle period.

When the available supply voltage is known in advance, e.g. by sampling and storing a previous waveform of the supply voltage, the control unit of the lighting application according to the invention can determine in advance an optimal sequence of powering the LED units such that an optimal use is made of the available voltage while at the same time, taking a required colour set point into account. As an example, FIG. 4 illustrates how the powering of three LED units can be performed as a function of time given a substantially sinusoidal supply voltage for the drive unit. The dotted lines 450 schematically indicate the required voltage for powering 1, 2, resp. 3 LED units. As can be seen, during period T1, no LED units are powered because the supply voltage (indicated by the curve 400) is too low. During period T2, the available voltage is sufficient to power one LED unit. As in FIGS. 3a and 3b, the LED units are indicated by rectangular shaped blocks, wherein the width of the block corresponds to the time an LED unit is powered and the height of a block represents the required forward voltage for providing a current to the LED unit. By sequentially powering the 3 LED units, (whereby each LED unit may have a different duty cycle), a user defined colour set-point can be realised. During period T2, two LED units can be powered at the same time, e.g. as indicated. During period T3, three LED units can be powered at the same time. The control unit (e.g. the control 40 as shown in FIG. 2a) of the lighting application according to the first aspect of the invention can be arranged to determine the appropriate duty cycles of the LED units for operating the LED units during the periods T2, T3 and T4. As such, the voltage available for powering the LED units (i.e. the voltage available at the terminals of the power converter that powers the LED units) can be applied in an efficient manner by adjusting the LED assembly topology in such manner that the required forward voltage can be provided by the (instantaneously) available supply voltage at the terminals of the power converter or drive unit. As will be acknowledged by the skilled person, the principle as described in FIGS. 3a, 3b and 4 can be applied to an arbitrary supply voltage available to the power converter.

The lighting application according to the first aspect of the present invention can thus be applied to retrofit a number of different lighting applications that are currently available on the market. Such lighting applications include, but are not limited to, conventional light bulbs that are powered from a mains supply or halogen light applications that require a low voltage DC supply. When such applications are provided with a dimmer circuit, the output voltage of the dimmer circuit which is applied to the lighting application may vary substantially. The lighting application according to the present invention is arranged to accept such varying supply voltage and adjust the topology of the LED assembly (e.g. by short circuiting one or more LED units) based on the available voltage.

In an embodiment, the LED driver according to the first aspect of the invention is arranged to diagnose the available supply voltage autonomously and adjust the control of the LED driver based on the diagnosis. As an example, the waveform analyser as applied in a LED driver according to the first aspect of the invention, can be arranged to determine certain characteristics of the supply voltage (such as average value, mean value, top value, frequency (content), etc.) and determine, based on the information the appropriate way to control the LED driver and/or LED assembly. Further details on this aspect of the present invention are provided below.

Figure 5:
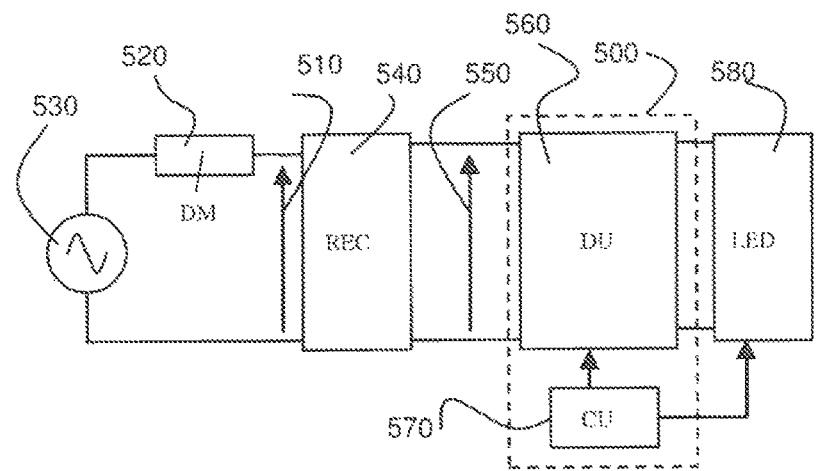
FIG. 5 schematically depicts an embodiment of an LED driver according to a second aspect of the present invention.
Figure 6:
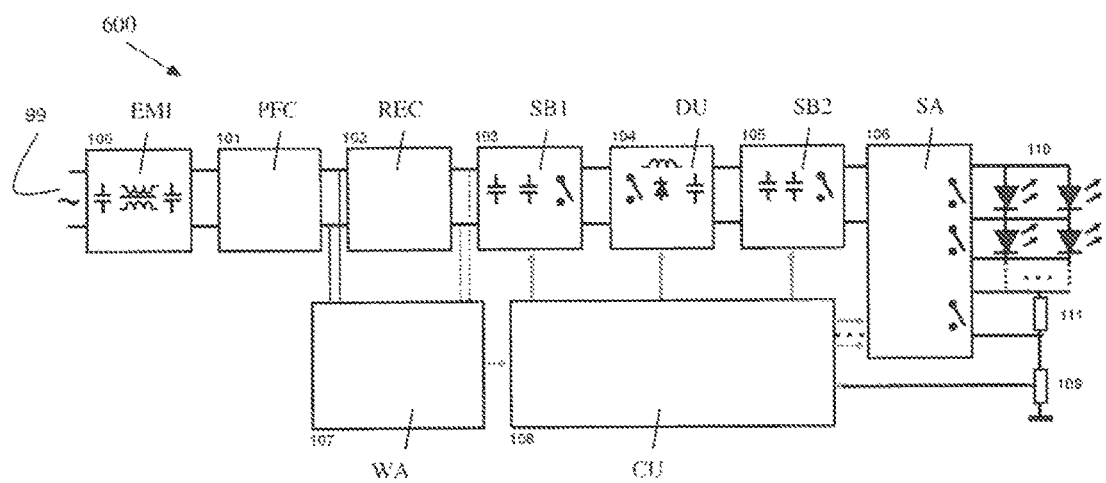
FIG. 6 schematically depicts a lighting application according to the invention comprising an embodiment of an LED driver according to the second aspect of the invention.

According to a second aspect of the invention, an LED driver is provided for powering an LED assembly. FIG. 5 schematically depicts such an LED driver 500, the LED driver can e.g. be arranged to receive an input voltage 510 such as a TRIAC dimmer output voltage, e.g. obtained from a mains AC voltage 530, for powering the LED driver 500. In order to provide the dimmer output voltage 510, the TRIAC of the dimmer (not shown) needs to be operable in a conduction state, which, as known to the skilled person, requires a current (holding current) to flow through the terminals of the TRIAC. As such a current may pose an important dissipation, it may be important to keep this current preferably as low as possible. The LED driver according to the second aspect of the invention is arranged to determine, e.g. in an iterative manner, the required holding current. In addition to the LED driver, FIG. 5 schematically depicts an (AC) power source 530 and a dimmer DM 520 (e.g. a phase controlled dimmer such as a TRIAC dimmer). The dimmer output signal 510 can, in general, directly be applied to the LED driver. In the arrangement as shown however, the dimmer output voltage 510 is rectified by a rectifier REC 540, the rectifier output voltage 550 being applied as supply voltage for the LED driver. The LED driver DU as shown in FIG. 5 can e.g. comprise a Buck or Boost converter 560 or the like for providing power to an LED assembly LED 580. As an example, the converter 560 may correspond to the converter 50 as depicted in FIG. 1a. The LED driver further comprises a control unit 570 for controlling a.o. the converter 560 of the LED driver. The control unit CU 570 may equally be applied to control the operating conditions of the LED assembly. In an embodiment, the LED assembly as powered by the LED driver according to the second aspect of the invention can e.g. be controlled by a switch assembly (not shown) that can e.g. comprise one or more switches (such as FETs or MOSFETs) to control the current through the one or more LED units of the LED assembly. The LED assembly as shown in FIG. 5 can e.g. correspond to an LED assembly as applied in an embodiment of the lighting application according to the first aspect of the invention. The LED driver as shown is further arranged to determine the required current for maintaining a TRIAC of the dimmer in a conductive state. In the embodiment of FIG. 5, this is implemented as follows: The control unit 570 of LED driver 500 is arranged to gradually decrease the current as provided to the load, i.e. the LED assembly. This can e.g. be established by controlling the switching operation of the switching element of the converter 570. By varying the duty cycle of such a switching element (e.g. the switching element T of converter 50 as shown in FIG. 1a), the current as provided by the dimmer 520 and thus the current as provided through a TRIAC of the dimmer, can be varied. As an alternative, the control unit 560 can be arranged to control the load as presented by the LED assembly 580 to the LED driver. In general, the variation of the current as drawn by the LED driver from the dimmer can be realised by varying the load that is powered by the LED driver or by controlling the LED driver directly. FIG. 6 schematically depicts an embodiment of a lighting application 600 comprising an LED driver (comprising a power converter or drive unit DU 104 and a control unit CU 108) according to the second aspect of the invention. The power converter 104 preferably comprises a buck regulator, e.g. out of cost, efficiency and size considerations, but may also comprise a buck-boost, boost, SEPIC, CUK, etc., or any multiples or any combinations thereof. Such a power convertor generally comprises one or more switching elements (as e.g. switching element T of converter 50 of FIG. 1a) which can, in the embodiment as shown, be synchronised to the line phase voltage 99, e.g. by control of the control unit 108. Such switching elements can e.g. comprise FETs, bipolar transistors, MOSFETs, etc. The (switched mode) convertor 104 may, in an embodiment, apply capacitors or inductors as storage elements that are switched. Such embodiments are discussed in more detail below. The power convertor may be direct off-line (not galvanically isolated) or galvanically isolated by e.g. a flyback transformer and accompanying switching element.

In the embodiment as shown, the variation of the current requirement of the LED driver (i.e. the current provided to the converter 104) is enabled by a variable load 111. As a variable load, the LED driver in the embodiment as shown, is arranged to provide a current to a resistor which is arranged in series with the LED assembly. The load as provided by the resistor can be varied by operating a switch (e.g. a FET or MOSFET) that is provided to short circuit the resistor. The switch can be operated at a comparatively high frequency at a variable duty cycle. As such, the resistor can represent a variable load which can substantially continuously be varied. By varying the load that is powered by the LED driver, the current that is e.g. provided by a TRIAC dimmer to the LED driver will vary as well. As such, by varying the duty cycle at which the resistor is operated, the current provided by the TRIAC dimmer can be gradually reduced. In accordance with an embodiment of the LED driver according to the second aspect of the invention, the control unit 108 of the LED driver can be arranged to control the variable load (represented by the switchable resistor 111) in order to reduce the supply current (i.e. the current as supplied by the TRIAC dimmer to the LED driver) and to measure a value of the input voltage (e.g. at an input terminal of the LED driver) in relation to the supply current. When the load is varied to such extend that the voltage at the terminals of the LED driver drops to zero, the load as presented by the LED driver is too small to maintain the TRIAC in a conductive state. Based on this, the control unit 108 can determine a minimum load requirement (or minimum supply current) for maintaining the TRIAC in a conductive state. Based on this information, the control unit 108 can be arranged to ensure that this minimum current is required by the LED driver's converter 104 during the time a voltage is required at the terminals of the LED driver. By doing so, the LED driver according to the second aspect of the present invention, enables a TRIAC dimmer to be operated at a minimum holding current as required by the TRIAC dimmer, the minimum current being based on the actual operating conditions rather than being set to a fixed holding current. By doing so, an important improvement of the efficiency of a lighting application comprising the LED driver can be realised: The minimum holding current of a TRIAC may vary substantially depending on the operating temperature of the TRIAC. At −40 C., a minimum holding current of approx. 30-50 mA may be required, while at +25 C. an average TRIAC only requires 5-10 mA. When the LED driver according to the second aspect of the present invention is not applied, the minimum load requirement of the LED assembly may need to be set such that a comparatively high current (e.g. 30 mA) is provided by the TRIAC, at all times, in order to ensure the conductive state while, due to the operating conditions, a much smaller current would be sufficient (e.g. 5 mA or less) to maintain the TRIAC in a conductive state. As will be acknowledged by the skilled person, operating the TRIAC dimmer at the actual minimum holding current (i.e. based on the operating conditions) can provide an important efficiency improvement of the lighting application applying the LED driver. As, due to varying operating conditions, the minimal holding current may also increase over time, it may be advantageous to operate the LED driver at an elevated minimum current (e.g. 10% above the minimum supply current as determined by the control unit). In such an embodiment, the control unit can thus be arranged to adjust the load of the LED driver (i.e. the LED assembly and/or the switchable resistor) to the control unit can be arranged to ensure that the minimum current as provided to the LED driver during the time a voltage is required at the terminals of the LED driver is above the minimum holding current of the TRIAC.

By providing a variable load in series with the LED assembly and controlling the load in a similar manner as the duty cycle of an LED unit of the LED assembly is controlled (e.g. by providing a switch (e.g. a FET or MOSFET) in parallel, as illustrated in FIG. 1*a*), use is made of the already available topology of the LED assembly and switching assembly. In addition, the embodiment as illustrated provides the advantage that the load can be varied with a comparatively high resolution, e.g. the same resolution as can be applied to the duty cycle of the LED unit. As such, the minimal holding current can be determined with a high accuracy.

The lighting application 600 as schematically depicted in FIG. 6 may further comprise the following components which can e.g. correspond to similarly numbered components of the lighting application as shown in FIG. 2*a*. As such, the lighting application can e.g. comprise, when required, an EMI Filter EMI 100 as discussed in more detail above. A further optional element is the power factor correction (PFC) element PFC 101 that can e.g. compensate for current distortions (e.g. due to capacitive and inductive loading versus purely resistance) to meet regulatory requirements on PFC. When the driver properties are sufficient to meet these requirements no PFC parts are added. For low power applications from 1 to about 30 W it is, in general, sufficient to apply a solution comprising diodes and capacitors for compensation. For higher power levels, an active mode for PFC can e.g. be used, often consisting of an additional boost mode power convertor, buck or buck-boost converters are other options for active mode PFC as well.

As already discussed above, the input voltage 99 of the lighting application can e.g. correspond to a TRIAC dimmer output voltage. Optionally, a rectifier element REC 102 can be applied to rectify the incoming waveform thereby generating a pulsed DC waveform that can be applied to supply the power convertor 104. In its simplest form it consists of a single diode which then leads to a single phase output with a large off-period. The preferred embodiment is a diode bridge consisting of 4 diodes that use both AC phases and lead to a fully rectified output. Due to the minimum forward voltage drops the diodes cause some current and voltage distortion and also account for some dissipation. Most of the dissipation can be removed by using low voltage drop switching elements (e.g. FETs) instead of the diodes.

As discussed above, the lighting application can be provided with an input filter and/or switchable buffer SB1 103 having the purpose of supplying the power convertor 104 when the voltage at the rectifier 102 output is below a minimum level suitable for the power convertor 104. As an example, the input filter can e.g. be a fixed input filter buffer directly connected to the rectified voltage (i.e. an output voltage of the rectifier 102. As an example of the switchable buffer, such a buffer can comprise a buffer element that can be temporarily connected to the rectified voltage in order to the buffer and, at a later time, connect the buffer element to the input of the power converter in order to discharge the buffer in order to supply power to the power convertor when the rectified voltage has fallen too low. The advantage of (dis-)connecting the buffer is to save the stored high voltage in the buffer for optimal use at the time it is needed. The moments for (dis-)connecting can be done autonomously in this element by always accepting charging and saving discharging only when the input voltage drops below the minimum level of the power convertor. A preferred embodiment however would give control to the controller (108) which can synchronise the (dis-)connection time-frames with the line phase which gives a more guaranteed buffer charging of each power cycle independent from momentary distortions of the line voltage. The buffer (or storage) element can e.g. comprise a capacitor but can also take the form of an inductor. The embodiment of the lighting application 600 as shown in FIG. 6 may further, optionally, comprise an output filter and switched buffer SB2 105 as described in more detail in FIG. 2*a*. Further details on a switchable buffer as e.g. applied in elements 103 or 105 of FIG. 6 are provided below.

Determining the actual minimal holding current can be done periodically in accordance with the period of the AC supply voltage of the TRIAC dimmer. It can be done each period, or less frequent, e.g. every 10 or more periods. The process of determining the minimal holding current as performed by the control unit of the LED driver according to the second aspect of the invention can preferably start from a minimum holding current as applied during a previous period. The lighting application 600 as shown in FIG. 6 further comprises a phase detector 107. Such a phase detector, can e.g., preferably over multiple cycles, determine a synchronisation of the controller to the line frequency. This can for example be done by (software) PLL locking to compensate for cycle-local line voltage distortions. The control unit 108 may then base all its control moments in time on the line synchronisation. It can be noted that a waveform analyser as e.g. applied in a lighting application according to the first aspect of the invention can be applied as a phase detector 107.

Figure 7A:
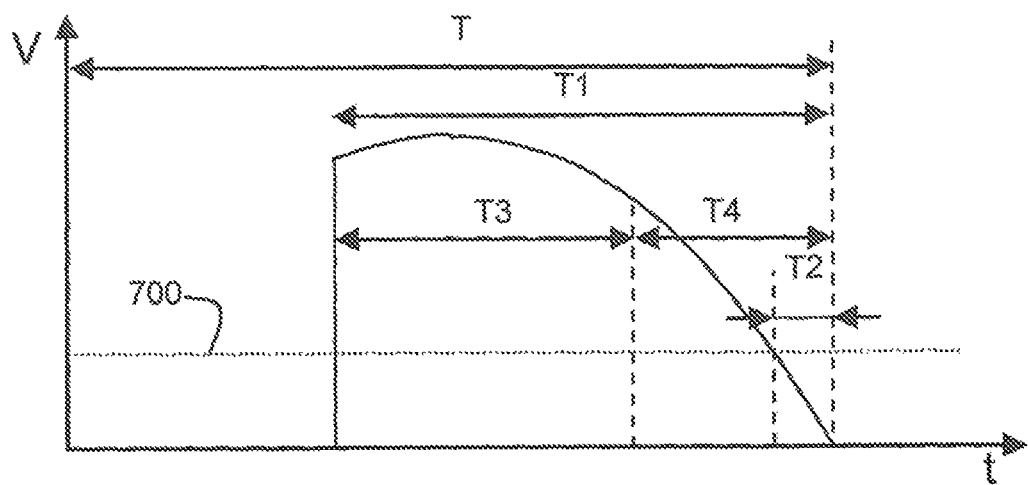
FIG. 7a schematically depicts a TRIAC dimmer output voltage and time intervals for assessing a minimal holding current for the TRIAC.

In an embodiment, the process of determining the minimal holding current to be provided to the LED driver is done during a part of the input voltage period when the LED units are not emitting light. This can e.g. be a trailing end of the periodic signal as provided by the TRIAC dimmer to the LED driver. This is schematically indicated in FIG. 7a. FIG. 7a schematically depicts an output voltage V of a TRIAC dimmer circuit having a period T, as a function of time t. Due to phase control of the TRIAC, only part (T1) of an e.g. sinusoidal input voltage is available at the output terminals of the TRIAC dimmer. In principle, the output voltage of the TRIAC dimmer (optionally after rectification by a rectifier) can be applied for powering an LED assembly during the entire part T1 of the period T, i.e. during the time when the TRIAC is conducting. As will be acknowledged by the skilled person, in order to power an LED or LED unit, a minimum voltage is required. As will be clear, such a minimum voltage requirement may depend on the actual topology of the LED assembly; when the LED assembly comprises multiple LEDs connected in series, the minimum voltage requirement for powering the multiple LEDs substantially corresponds to the sum of the forward voltage of the individual LEDs. In FIG. 7a, such a minimum voltage is indicated by the dotted line 700. As a consequence, part T2 of the voltage is insufficient to power an LED unit. Part T2 of the output voltage period T may however be applied to determine the minimal holding current. During this part of the period T, the control unit can (as discussed above) gradually reduce the supply current to the LED driver e.g. by varying the load e.g. represented by a switchable resistor until a voltage drop to zero is observed and thus the minimal holding current is found. As the analysis is performed during part of the period wherein the LED or LED units of the LED assembly are not emitting light, a load flicker due to the TRIAC losing its conductive state will not be observed by the user. In general, the entire part T1 of the period T could be subdivided into a part T3 dedicated to be applied to power the LED assembly and a part T4 dedicated to determine the minimal holding current. The part dedicated to determine the minimal holding current is preferably selected to be the trailing part of T1 (i.e. trailing to the part applied to power the LED assembly) as determining the minimal holding current may result in the TRIAC losing its conductive state, which could e.g. be observer as load flicker.

The minimum holding current as determined, can subsequently be applied during a next period of the dimmer output voltage to set the required LED assembly load and, if required, a variable load.

In case only part of the available voltage part T1 is applied to power the LED assembly, a further efficiency improvement can be obtained as follows: when the process of determining the minimal holding current during part T4 of the voltage T1 is only applied during one period every 5 or 10 periods, the load current as provided by the dimmer circuit to the LED driver may be reduced to zero during the other periods. As such, the minimum holding current is only supported during that part of the voltage period T1 that is used to power the LED assembly, i.e. part T3. The dissipation associated with maintaining the minimum holding current during part T4 of the voltage period T1 may thus be reduced significantly.

Figure 7B:
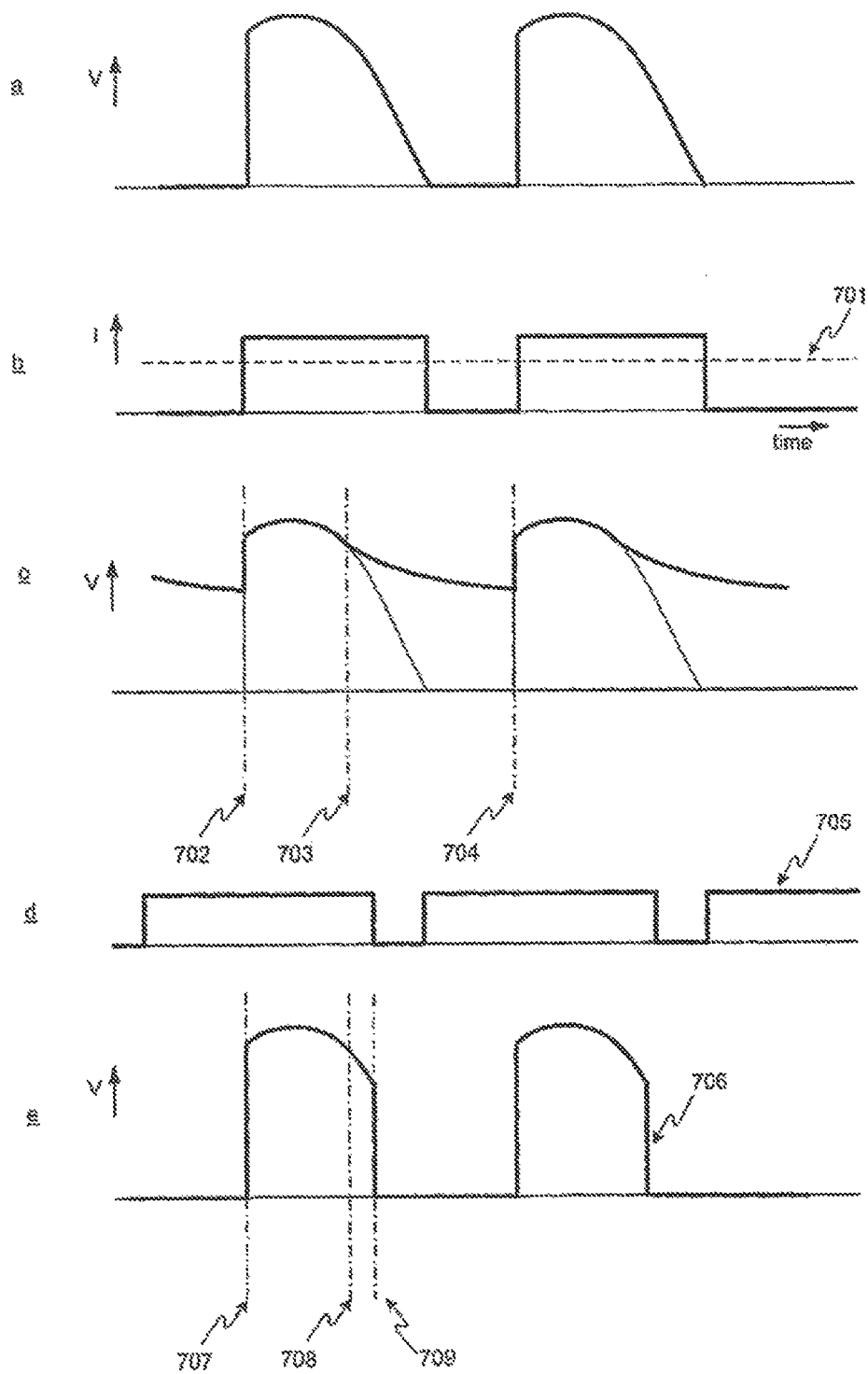
FIG. 7b schematically depicts controlling a time interval wherein a minimal holding current is supported.

To illustrate this, FIG. 7b schematically depicts how a minimal holding current is supported in a selected interval for power efficiency reasons. In FIG. 7b, graph a depicts a rectified idealised voltage input as e.g. provided by a TRIAC dimmer. Graph b shows the intervals where the holding current needs to be drawn in order for the TRIAC to stay on when a voltage V as shown in graph a is available (i.e. not equal to zero). Graph c of FIG. 7b schematically depicts the available voltage (thick line) in case a buffer capacitor is applied (more details of such an arrangement are provided below). It is assumed that the buffer capacitor is used to supply the load as from instance 703. As such, it can be noted that current is actually only drawn from the dimmer between instances 702 and 703. As such, the TRIAC may abort its conducting phase too early which can be considered improper behaviour for stable light output. In graph d of FIG. 7b, curve 705 shows a chosen (e.g. by the control unit 108 as shown in FIG. 6) segment of time where the holding current will be supported. In graph e of FIG. 7b, the resulting waveform from the TRIAC input voltage can be seen. As a result of the controlled support of the minimal holding current, between 707 and 709 the holding current is guaranteed. By the methods mentioned above it is still possible to determine the required dimming level by regularly testing a full or half period of the supply voltage for the appropriate TRIAC dimming level setting.

The LED driver according to the second aspect of the invention can e.g. be applied in a lighting application comprising an LED assembly and a switch assembly.

In an embodiment, the LED driver according to the second aspect of the invention is provide with an input buffer such as a capacitance. Such an input capacitance can be applied as a buffer for providing a supply voltage to the LED driver when the supply voltage is comparatively low. Such a capacitance may equally serve as a filtering element.

When an LED driver such as an LED driver according to the second aspect of the invention, is powered by a TRIAC dimmer output voltage, the LED driver should adjust the brightness of the LED assembly that is powered when the dimmer is operated, thereby e.g. mimicking the dimming of a light bulb that is powered by a dimmer circuit. In order to adjust the brightness, the LED or LED units of the LED assembly can e.g. be operated at a different duty cycle. In order to assess the dimmer level, various options exist:

As a first example, the average dimmer output voltage can be determined and provided as an input signal to the control unit. In order to obtain such an input signal, the dimmer output voltage can be rectified and filtered such that a DC signal is obtained.

As a second example, the LED driver can be arranged to analyse the dimmer output voltage and determine a brightness set point based on the analysis. In an embodiment, the LED driver is provided with a phase analyser for analysing the dimmer output voltage. The phase analyser can e.g. determine, based on the dimmer output voltage or a signal representing the dimmer output voltage, the zero crossings of the dimmer output voltage. As such, a phase analyser may equally determine the phase angle describing the phase cut made by the dimmer circuit. Based on this, the control unit can determine a set point for the brightness.

It can further be noted that the waveform analyses as e.g. applied in the lighting application according the first aspect of the invention may equally be applied to facilitate the determination of a brightness set-point for the control unit of the LED driver.

As a third example, in case a switching converter such as a Buck or Boost converter is applied for powering the LED assembly, monitoring the duty cycle of the switching converter can be used to determine the required dimming level. This can be understood as follows with reference to FIG. 1a: When a switched converter as the Buck converter 50 shown in FIG. 1a is applied to power an LED assembly, the converter 50 is, in general, controlled to provide a substantially constant output current to the LED assembly. In order to maintain such a constant output current, a switching element of the converter, e.g. switch T of converter 50 in FIG. 1a, will operate at a certain duty cycle. In case the input voltage V of the converter would change, this change would affect the duty cycle of the switching element. A larger input voltage V would require the switching element T to operate at a smaller duty cycle in order to maintain the output current I at the same level. Note that the output current I (or load current) can be determined from the voltage drop over the sensing resistor Rs. This mechanism can be applied to adjust the brightness of an LED assembly in the following way. Assuming that an increase of the input voltage would lead to the switching element T operating at a smaller duty cycle. By setting the brightness set point higher (and/or change the topology of the LED assembly), the power drawn from the regulator/power converter 50 is increased causing the duty cycle of the switching element to increase again. So by changing the set point of the brightness (and thus the dimming level), the duty cycle of the converter switching element is kept substantially constant, and the dimming level will substantially follow the incoming average voltage level and thus the TRIAC dimmer setting.

In such an embodiment, no additional hardware such as an ADC (analogue to digital converter) for providing a signal to the control unit representing the input voltage.

As a fourth example, which will be explained in more detail below, the required dimming level can be derived from a voltage available over a buffer or switchable buffer as e.g. applied in an LED driver according to a third aspect of the invention, It is worth noting that the assessment of the appropriate dimming level as described by the above examples, may be applied in any of the drive units or converters as applied in the present invention.

As already discussed above, in order to remain in a conductive state, a current that is equal or larger than the holding current (depending on operating conditions such as temperature) needs to flow through the terminals of the TRIAC.

LED drivers as generally applied to power LED assemblies comprise a converter for providing a substantially continuous DC current to an LED assembly. Such a converter can e.g. be a Buck converter as schematically depicted in FIG. 1a. Depending on the state of the switching element T of the converter, the current as provided to the LED assembly is provided via the diode D or via the switching element T. As such, the actual current that is drawn by the LED driver e.g. from a dimmer circuit is a pulsed current. As an examples, the switching element T of the converter can operate at a 500 kHz frequency.

Due to input filtering before the LED driver, e.g. by an input filter as discussed above or the application of an EMI filter, the current as provided by the TRIAC dimmer is a substantially continuous current (when the TRIAC is conducting) rather than a pulsed, e.g. at 500 kHz, current. It can be noted that, in practice, an actual input filter is not required to ensure that the TRIAC dimmer provides a substantially continuous current rather than a pulsed current due to the wiring that is available between the dimmer and the light source, i.e. the LED assembly.

As explained above, the LED driver according to the second aspect of the invention enables an energy efficient application of a TRIAC dimmer in that the LED driver can determine the minimal required holding current and operate the LED driver in such way that, when a supply voltage is required, the minimal holding current is drawn by the LED driver.

The LED driver according to the second aspect of the invention is particularly suited to be applied in a lighting application having multiple LED assemblies, each LED assembly being powered by an LED driver, the multiple LED drivers being powered by a common TRIAC dimmer. In such an arrangement, the required minimal holding current can e.g. be drawn by only one of the LED drivers or as the sum of a minimal current drawn by two or more of the LED drivers.

As explained above, an LED driver can e.g. be provided with a so-called input buffer (e.g. a capacitance) which can be applied for providing a supply voltage to the LED driver when the supply voltage is comparatively low. Such a capacitance may equally serve as a filtering element. Such an input buffer can be significantly reduced when a switching element is provided, e.g. controlled by a control unit of the LED driver, for connecting and disconnecting the buffer to the supply voltage. Therefore, according to a third aspect, the present invention provides an LED driver for powering an LED assembly comprising at least one LED, the LED driver comprising a converter for converting a periodic input voltage to a supply current for powering the LED assembly, the LED driver comprising a converter having input terminals for receiving the periodic input voltage, the LED driver further comprising a control unit and an input buffer connectable to the terminals by a switching element, the control unit further being arranged to control the switching element to connect and disconnect the input buffer to the terminals.

The LED driver according to the third aspect of the invention can be e.g. be applied in an application as e.g. shown in FIG. 2a, 5 or 6.

When an LED driver is powered by a periodic input voltage (e.g. a rectified AC voltage or a dimmer output voltage), it may occur that the input voltage is insufficient to power a LED assembly. Such a situation is illustrated in FIG. 8.

Figure 8:
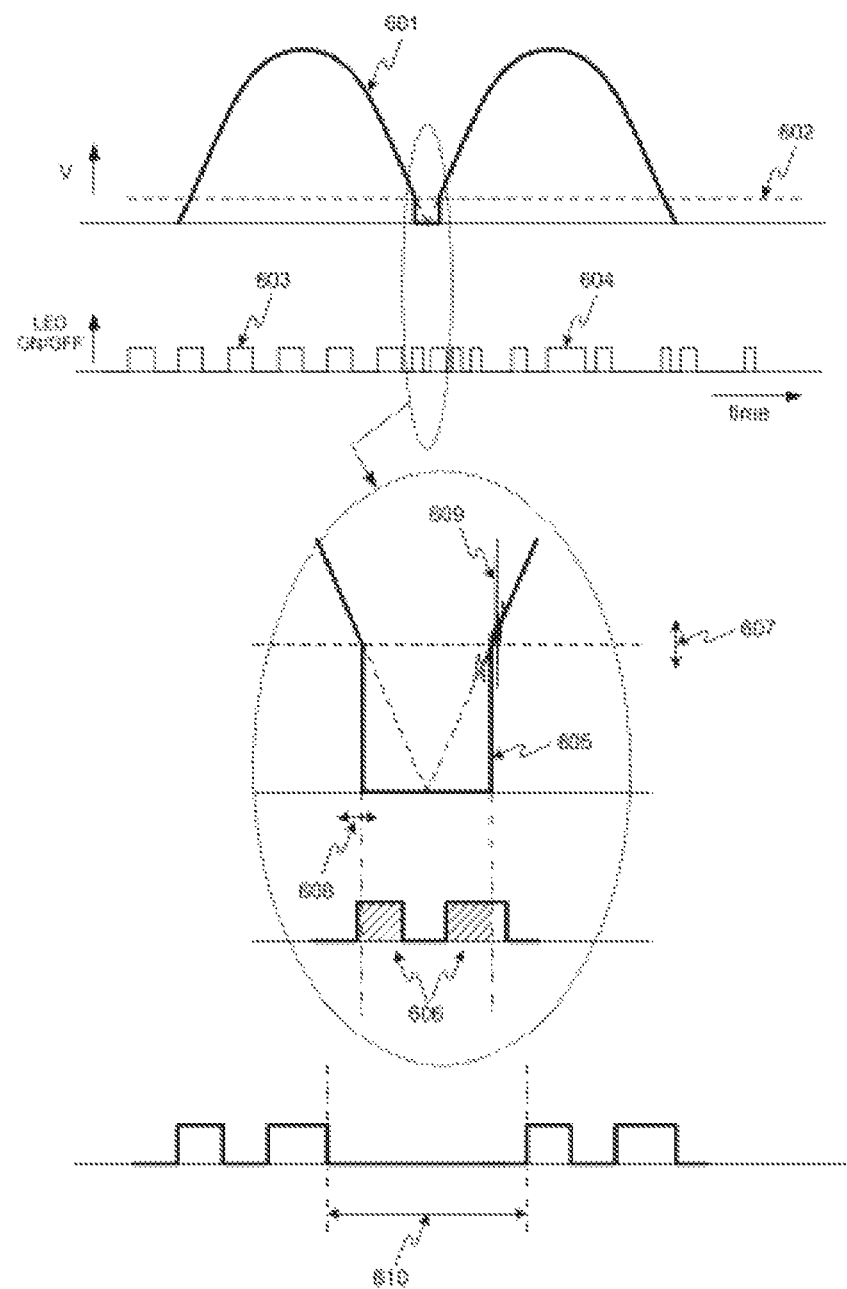
FIG. 8 schematically depicts a possible effect on light output when powering an LED driver by a rectified sinusoidal voltage when no input buffer is applied.

In FIG. 8, a rectified sinewave 601 as e.g. obtained as output voltage of a rectifier (e.g. rectifier 102 as shown in FIG. 2a, 5 or 6) is shown. During a certain interval, the output voltage may drop below a minimum supply level 602, e.g. required by a power converter (e.g. power converter 104 as shown in FIG. 2a, 5 or 6). The resulting waveform 601 is the supply waveform as received by a power converter (e.g. converter 104 of FIG. 2a, 5 or 6) and is shown as a bold line. The converter may provide a current through an LED assembly (e.g. assembly 110 of FIG. 2a, 5 or 6) at a certain duty-cycle as e.g. depicted at 603 and 604. It can be noted that, to obtain a varying light output, the duty cycle and frequency thereof may change over time. A controller or control unit (e.g. control unit 108 of FIG. 2a, 5 or 6) can e.g. control the power converter and/or a switch assembly such as switch assembly 106 of FIG. 2a, 5 or 6 to provide the required current (e.g. amplitude, duty cycle or frequency). As illustrated in FIG. 8, when the timing of switching the LED current on and off is not synchronized to the frequency of the supply voltage (e.g. a mains supply voltage), a certain amount of light output can be lost (indicated by the grey surfaces at 606). The size of the grey surfaces may depend on a number of factors. Under the assumption that the switching of the LED current is not synchronised to the supply voltage, the control unit is unaware of the interval when the supply voltage is too low. Further, there may be uncertainty with respect to the timing when the voltage drops to zero (608) due to variation in the supply voltage at moment 608 as well as an uncertainty in the level 607 where the power converter and control unit are ineffective in providing a current to the LED assembly. Such uncertainty may even be increased by disturbances 609 which can be present on the supply voltage and are usually only partially filtered. All these effects may cause an undesirable fluctuation of the light output of several percent, which can be easily observed by humans. In general, such uncertainty may have a base frequency which is double (in case of a full bridge rectified voltage) the supply voltage frequency, e.g. 50 or 60 Hz in case of a mains supply.

To substantially remove these effects, the LED driver according to the third aspect of the invention can be synchronised to the frequency of the periodic supply voltage and/or be provided with a switchable buffer for, at least partly, bridging an insufficient voltage supply. By synchronising the power supply to a LED assembly with the periodic supply voltage, a window 610 could e.g. be created in which no LED current is allowed to flow. By doing so, an uncontrolled light output can be avoided.

The application of a switchable buffer (embodiments of which are discussed in more detail below) is illustrated in the following FIG. 9.

Figure 9:
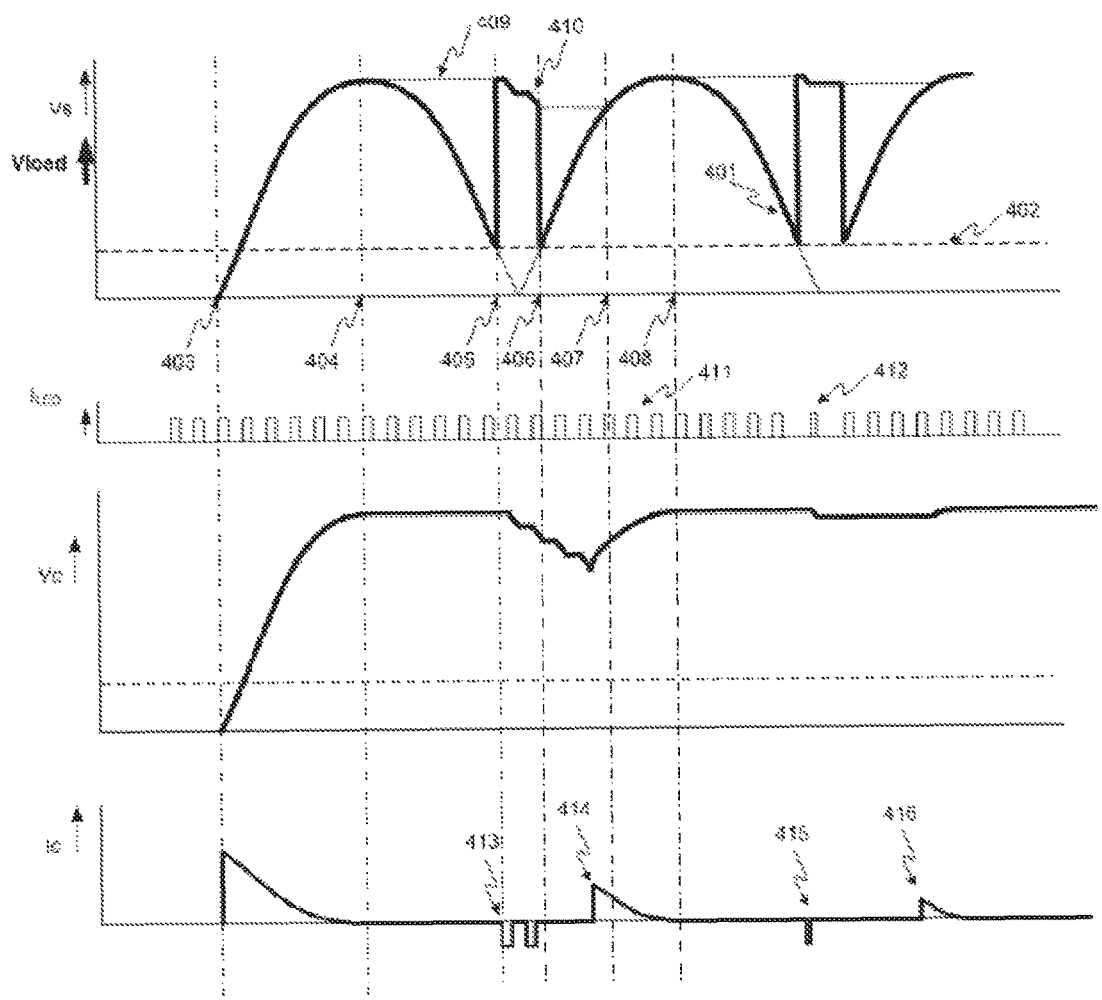
FIG. 9 schematically depicts voltage and current waveforms of an LED driver applying a switchable buffer.

In FIG. 9, a full bridge rectified waveform 401 (thin line) is shown as e.g. provided by a rectifier such as the rectifier 102 of FIG. 2a, 5 or 6, in case the rectifier is not loaded. The dotted line 402 indicates a minimum level of supply voltage as required by a load of the rectifier. Such a load can e.g. comprise any combination of components 103 to 110 as depicted in FIG. 2, 5 or 6. In case the voltage waveform 401 would be supplied to the load, the load would not be powered properly between instances 405 and 406 since the available voltage 401 is lower than the required level 402.

By applying a switchable buffer, it is feasible to deliver a voltage higher than the 404 level between instances 405 and 406 without significantly compromising the power factor. To that end, a switchable buffer such as a capacitor can be connected to the available voltage 401 as long as voltage over the capacitor is lower than the available voltage 401 (f.e. through a diode). From instances 403 through 404, an initial charging of the capacitor is shown, for example after an initial power-up. As soon as the 401 voltage diminishes at instance 404, the capacitor can be disconnected from voltage 401 (e.g. by operating a switch connected in series to the capacitor, see further on) and the voltage over the capacitor can remain at level 409. At instance 405 the capacitor can be re-connected to voltage 401 thereby raising the voltage provided to the load (e.g. any combination of components 103 to 110 as depicted in FIG. 2, 5 or 6) to the capacitor voltage at level 409 as the diodes of the rectifier (e.g. rectifier 102 of FIG. 2, 5 or 6) will reverse (indicated by the waveform in bold). Due to the load drawing current from its supply voltage (see 413), the capacitor voltage will drop accordingly as indicated by the part of the waveform at 410. At instance 406, the capacitor can be disconnected again and at instance 407 the charge/discharge scheme can be repeated. In general, the buffer can be connected to the voltage 401 when the voltage exceeds the voltage over the capacitor. The capacitor can e.g. be disconnected from the voltage 401 as soon as the voltage 401 starts diminishing. The discharging of the capacitor can e.g. be triggered by the supply voltage dropping below a certain level, e.g. the minimum voltage for powering the load. In this way, while the supply voltage towards the load is kept above the minimum level, the amount of energy stored in the capacitor is used as little as possible between instances 405 and 406 and repetitions thereof, causing the capacitor to be recharged only minimally from instance 405 until instance 406. A lower charge current may results, thus compromising the power factor less. Further improvement is possible by distributing the load in time so that the least current is drawn at the times the capacitor supplies it. This can e.g. be established by e.g. lowering the current as provided to the load (i.e. providing a current with a smaller amplitude) or by changing (reducing) the duty cycle of the current when the supply voltage originating from the rectifier is comparatively low. The latter solution is illustrated in FIG. 9 as can be seen from the load difference between 411 and 412 and the resulting capacitor currents at 413, 414 versus 415 and 416.

By redistributing the load in accordance with the available voltage, as illustrated, the energy drawn from the capacitor can be minimised thus optimising the power factor.

Figure 10:
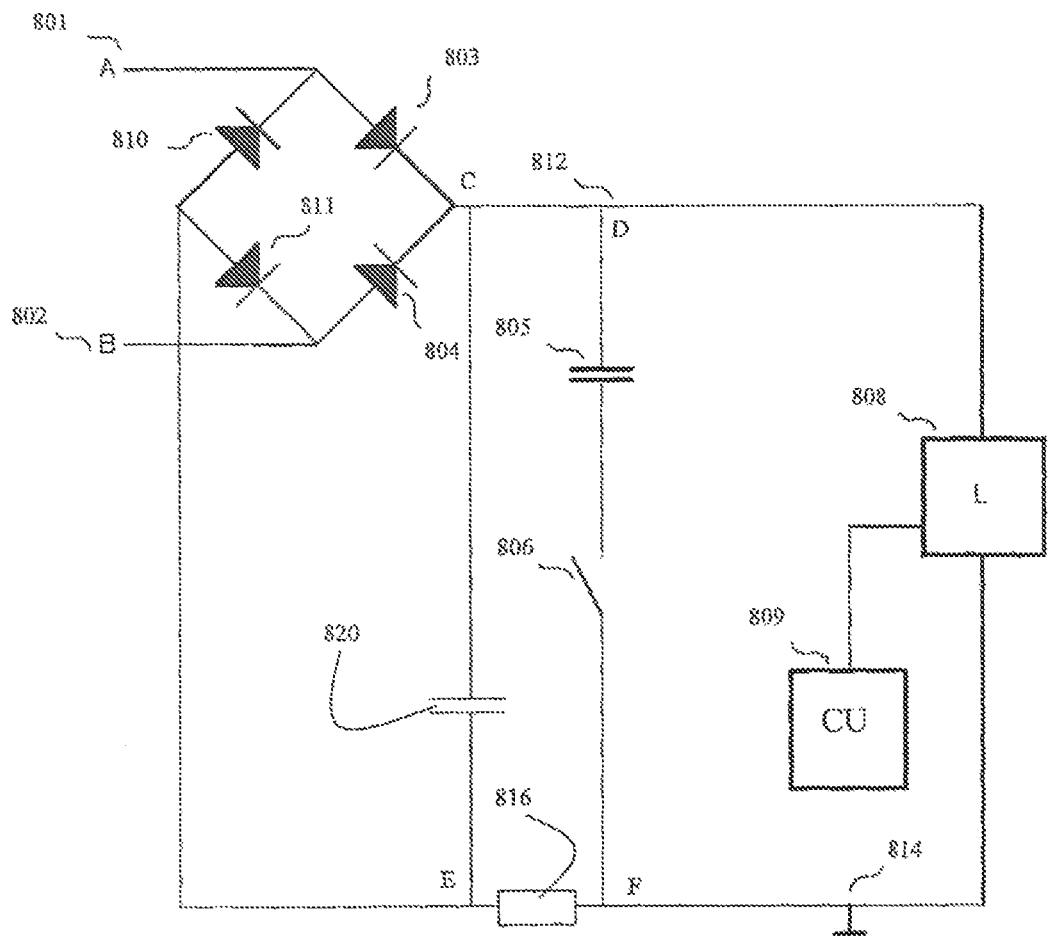
FIG. 10 schematically depicts a first embodiment of a switchable buffer as can be applied in the present invention.

A first example of how such a switchable buffer can be realised is schematically depicted in FIG. 10. In FIG. 10, an AC supply voltage is provided at terminals 801 and 802. A double rectifier (Graetz-bridge) comprising diodes 803, 804, 810 and 811 may deliver a waveform comprising equal half sine-waves at a frequency that is double that of the AC input. This waveform can be influenced by the load to the rectifier bridge. Typically this load comprises a permanently connected capacitor and the actual load, e.g. a power converter of a LED driver. In the embodiment as shown, the load comprises a switchable capacitor 805 (that can be connected and disconnected to the rectified voltage 812 through a switch 806 (e.g. a FET or a MOSFET) and a load 808 controlled by a control unit 809. The load can e.g. be any of the lighting applications as described above. By providing a switchable capacitor rather than a fixed capacitor, the following objectives may be pursued: By providing a switchable capacitor, a comparatively small capacitance may be sufficient to bridge a gap (in time) where the supply voltage is insufficient. As such, non-electrolytic types of capacitors can be applied, which, in general, have a longer life-time compared to electrolytic capacitors. A further objective that can be realised is to improve the power factor by diminishing current peaks due to charging of buffer capacitors.

The embodiment of FIG. 10 further shows an optional filter capacitor 820 which can e.g. be applied for EMI reduction. In an embodiment, the capacitance of the filter capacitance 820 can be comparatively small (e.g. a few microfarad) compared to the switchable capacitor 805. In case a filter capacitor 820 is applied, it may be advantageous to provide a switch 816 which can e.g. be opened when capacitor 805 is discharging thereby avoiding the capacitor 805 to provide energy to the filter capacitor rather than to the load 808. By doing so, apart from an efficiency improvement, an EMI improvement and audible noise improvement can be realised as well. Preferably, the switch 816 is provided between nodes E and F of the ground conductor 814, rather than between nodes C and D of the live wire or conductor having the supply voltage 812.

Figure 11:
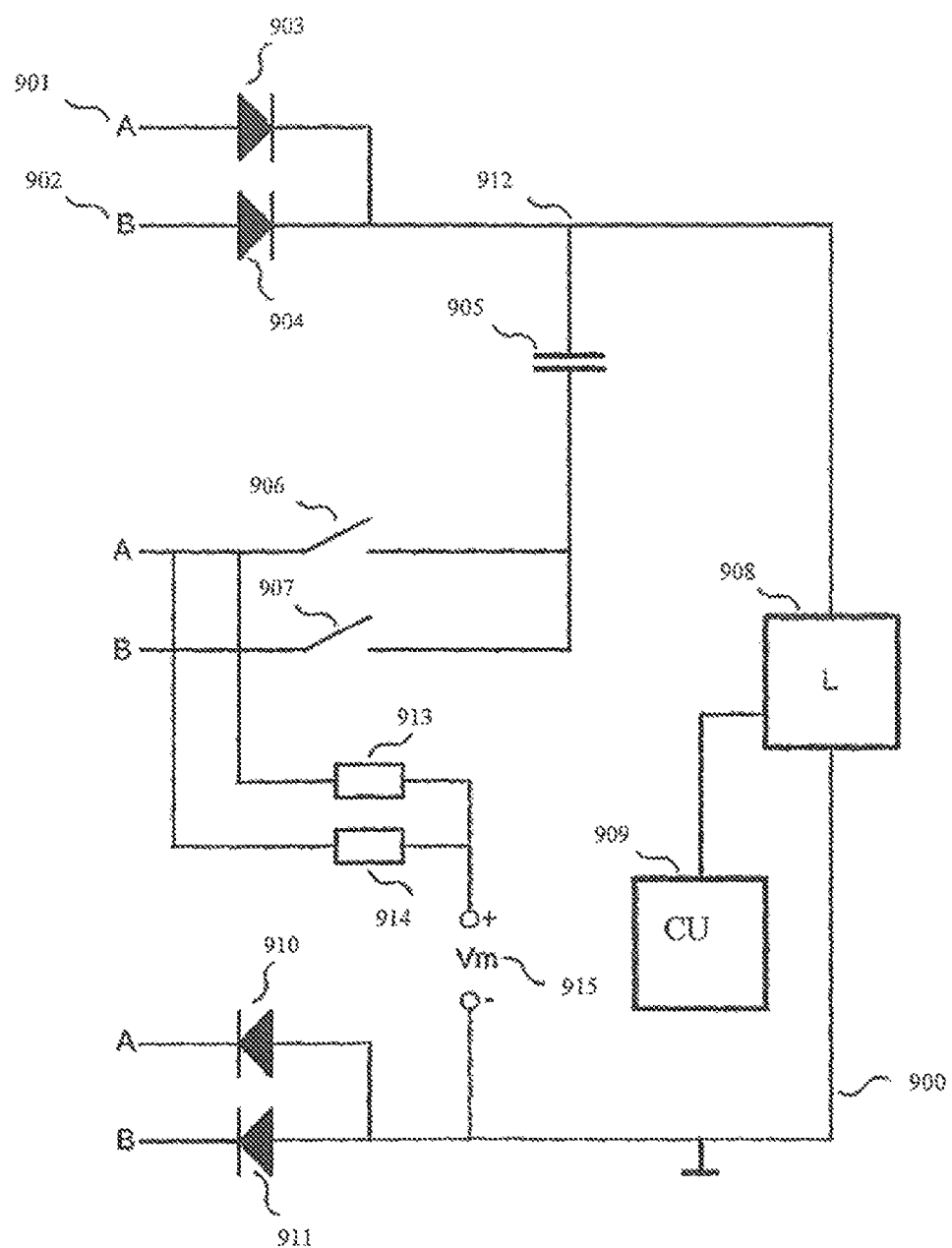
FIG. 11 schematically depicts a second embodiment of a switchable buffer as can be applied in the present invention.

A second embodiment of a switchable buffer is schematically depicted in FIG. 11. The terminals A (901) and B (902) as shown can e.g. correspond to the live and neutral wire respectively of a mains network at f.e. 230$V_{AC}$ or 120$V_{AC}$, or to any AC source. Diodes 903, 904, 910 and 911 are arranged to form a Graetz bridge for double sided rectification of the AC waveform. To explain the operation of the arrangement as shown, it is assumed that the voltage at A is higher than the voltage at B. The same description can be applied for the case where B is higher in voltage than A by using B where A is written and A where B is written.

As depicted, a load L (908) is connected directly to the doubly rectified voltage. Assuming that the load requires a minimum voltage Vmin (e.g. corresponding to voltage level 402 in FIG. 9) to operate, the load may sometimes not function properly e.g. when the voltage 912 drops below Vmin. It is often seen that a capacitor is placed across the load to buffer the energy to supply the load during the times that the AC voltage supplied to A and B has too low an amplitude. By applying the topology as schematically depicted in FIG. 11, the voltage across the capacitor can be summed to the voltage on the A terminal during the period in time that the load would otherwise be supplied with a voltage lower than Vmin. To achieve this the capacitor 905 is made switchable. In a first state, the capacitor can be connected to terminal B using switch 907 to charge it until it has substantially the maximum amplitude of the applied AC voltage between A and B across its terminals. The bottom terminal of capacitor 905 can be disconnected by opening switch 907 when the maximum charge voltage has been reached. As a result, the voltage across the capacitor can substantially stay at the same value, which is substantially equal to the maximum amplitude of the supplied AC voltage at terminals A and B. Subsequently, the voltage across the load may diminish from a maximum amplitude to 0. Before reaching 0, at Vmin, the topology as shown enables the capacitor's voltage to be added to the voltage at terminal A by closing switch 906. As a result, the voltage across the load may rise to the sum of the voltage at A and the voltage across the capacitor. Diode 903 will reverse. When the load's current can thus be delivered by the capacitor, the AC voltage may reverse so that the voltage at A will be lower than that on B. When the voltage difference between B and A is higher than the voltage on the capacitor, diode 904 may become conductive and the capacitor may charge again. In case the voltage at A is smaller than the voltage at B, the above description can now be repeated reading B where A is written and reading A where B is written. As will be acknowledged by the skilled person, other topologies of switchable capacitors enabling the voltage available over a charged capacitor to be added to the supply voltage (or rectified supply voltage) can be devised as well. The embodiment of FIG. 11 is merely serving to illustrate the principle.

It can be noted that more advanced schemes of switching the capacitor (in general the buffer) can be used. Such schemes can e.g. apply one of the following approaches: The first approach is to use knowledge about the form of the sine wave combined with the value of its period (f.e. 20 ms). This can be called a time based approach. Using such an approach, the switches can be operated on a certain moment in time relative to the starting of a new half-period. The second approach is to monitor the voltage levels and behaviour at certain nodes in the topology. The following situations can be distinguished. In situation 1, the voltage waveforms at terminal A (901) is measured f.e. using an ADC (analogue/digital converter). In situation 2 the voltage is measured at 912. In situation 3 the voltage Vm (915) is measured.

For low voltages like for example 12 VAC, the peak value of the rectified voltage would be approximately 17V. Subtracting 2 times a diode forward voltage (for example when A>B the diodes 903 and 911 would conduct), the peak value of the supply voltage as seen by the load would be approximately 15V or even lower. To supply a typical 4 LED RGBW serial topology, a voltage of between 11.5V and 16V is required, depending on the LED type used. Considering also the voltage loss across the converter or drive unit (e.g. a Buck converter), the final voltage across the LEDs would be even lower. In order to mitigate the voltage loss across the diodes, the following embodiment can be applied:

The diodes 903 and 904, and the diodes 910 and 911 in FIG. 11 may cause a lower supply voltage to the load 908 because of their forward voltage drop. A method of avoiding this is to replace the diodes by switches that are controlled by a microcontroller (in general, a control unit) μC to close and open substantially at the same times a diode would switch from conducting state to non-conducting state and vice versa.

In an embodiment of the invention (schematically depicted in FIG. 12) such a switch can e.g. be a FET with a built-in diode as schematically indicated by 503, 504, 505, 506, 507, 511 and 512. In this way, a FET can be controlled by the mains voltage itself. When for example a FET is not conducting in a certain half-period and the AC supply voltage reverses, the diode in the corresponding FET will start conducting so that the flow of the current is guaranteed. By connecting the gate of that FET to the opposite AC connection (when the FETs source is connected to A, the gate would be connected to B and vice versa), the FET would start conducting when the difference between B and A would have grown to approximately 2.5V. From that moment on, the voltage loss would be only in the order of a few tenths of a volt. For higher AC voltages, a protection circuit could be placed in the gate control path that would limit the Vgs to a value below the maximum allowable voltage.

Note that the circuit comprising FETs 511 and 512 can function for all kinds of input voltage, AC as well as DC.

When FETs instead of diodes are used, the switching to the appropriate phase resulting in the rectified voltage, does not occur automatically. In order to attain substantially the same rectified output voltage (apart from the voltage drop over the diodes) as when a full bridge rectifier is used, the following rules should be implemented (e.g. in the controller or control unit controlling the FETs):

In order to ensure proper operation, the following rules for controlling the FETs should be obeyed:

Rule 1: The FETs 503.1 and 503.2 may not conduct simultaneously.

Rule 2: The FETs 511 and 512 may not conduct simultaneously.

Rule 3: Gates 503.1 and 503.2 may not put the corresponding FET in conduction mode when the capacitor is used to provide the supply voltage, i.e. when in FIG. 12 the FETs 504/505 or FETs 506/507 are conducting).

In order to realise these rules, the gates of FETs 503.1/503.2/511 and 512 should be controllable rather than being connected to the AC terminals A and B.

Also the FETs 503.1 and 503.2 could be chosen to not contain a diode. In that case, the gate control signal must obey some rules which can be implemented in the microcontroller.

Also the FETs 503 and 504 could be chosen to be N-FETs instead of P-FETs. In the latter case the control is more difficult as the gates need a voltage higher than the maximum voltage available anywhere in the circuit. Some kind of boost circuit known in literature could be used. This would form a cost advantage.

Note that, in case the switchable buffer as shown in FIG. 10, is used, it can equally be implemented by FETs, replacing diodes 803, 804, 810 and 811 by FETs 503.1, 503.2, 511 and 512. In this case, the gates of FETs 503.1,503.2, 511 and 512 can be connected as shown in FIG. 11.

Figure 12:
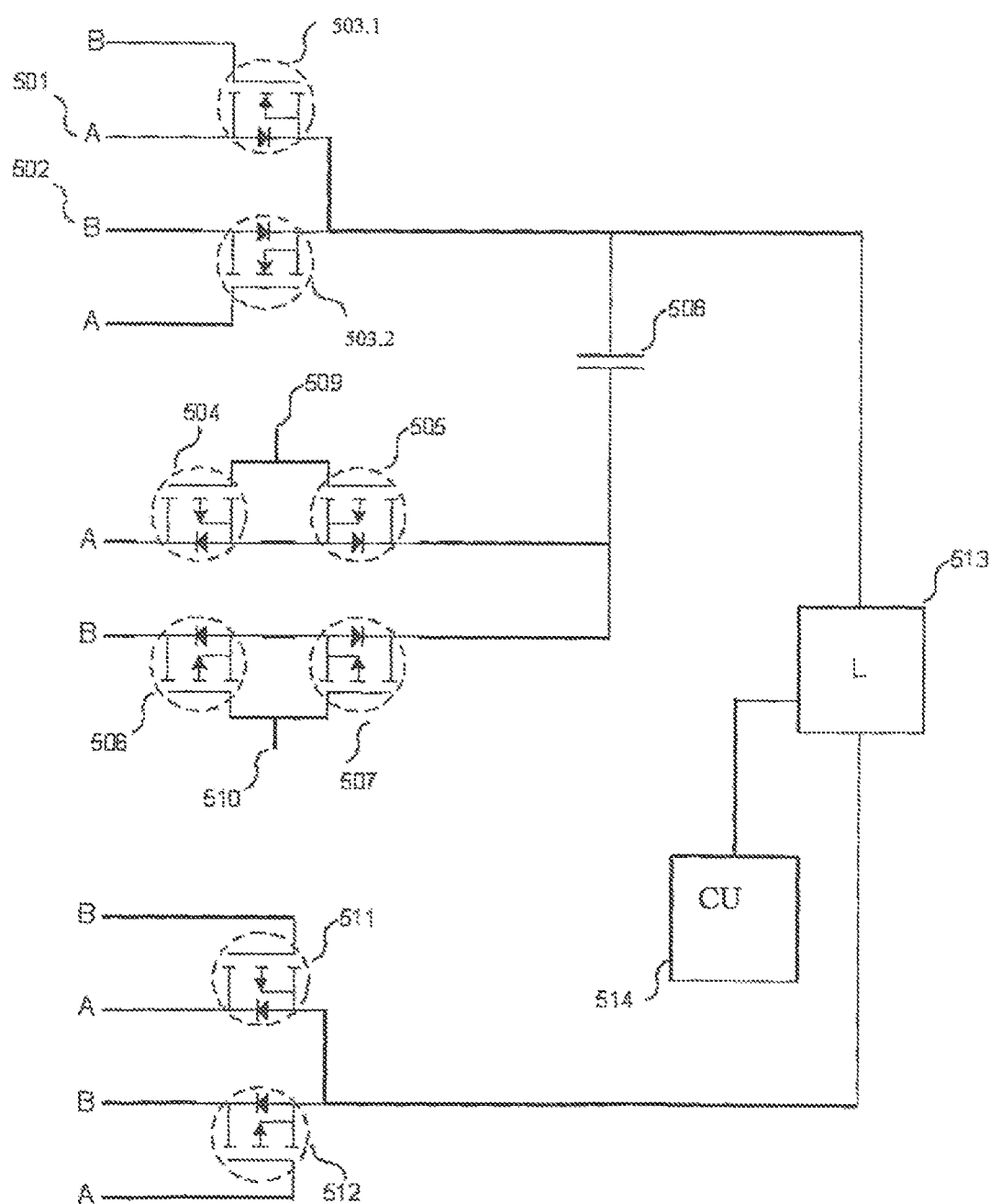
FIG. 12 schematically depicts the switchable buffer of FIG. 11 applying switches rather than diodes.

FIG. 12 further schematically indicates a more detailed implementation for the switches 906 and 907 as indicated in FIG. 11. As a switch, two FETs (e.g. 504 and 505 for connecting to A and 506 and 507 for connecting to B) are connected back to back and controlled with 1 mutual gate connection (509 and 510 respectively). The gates can be controlled from the micro-controller 514 but also by hardware-only solutions. Note that the 906 and 907 switches of FIG. 11 could also be replaced by 1 FET per switch when FETs without internal diodes are used. It can however be noted that FETs without internal diodes are rarely used.

It is worth noting that, in order to obtain an implementation of a control unit (or controller) as e.g. shown in FIG. 1a, 2a, 5 or 6, use can be made of a finite state machine or similar control concept known to those skilled in the art, in order for the control unit to respond to one or more varying conditions. Referring to FIG. 2a, the control unit can e.g. be arranged to respond to (changes in) signals of the (external) power supply of a LED driver, e.g., measured at terminals 99 or in between components (e.g. components 102 and 103) or measured inside one of the components. Such signals can e.g. be provided to a control unit (e.g. via an analogue to digital conversion in case of a digital controller) and can be interpreted by the controller in order to assess if certain conditions are fulfilled. Such conditions, e.g., measured on the supply voltage or on the supply voltage between components 103 and 104 can e.g. be "top of voltage reached", "zero crossing detected", "waveform trend is positive", "time passed since top, is larger than X milliseconds", "voltage is above or below a certain threshold", etc. It will be clear to the skilled person that other conditions as obtained from other components (such as the LED assembly or the waveform or phase analyzer can also be used as input for the control unit in order for the control unit to determine if certain conditions are met or not.

The present invention encompasses, as explained above, various aspects. The present invention e.g. discloses various embodiments of LED drivers that can e.g. be applied to retrofit existing lighting applications to LED lighting applications.

It will be clear the skilled person that the functionality as provided by the different LED drivers and lighting applications according to the invention can be combined. As an example, the lighting application according to the first aspect of the invention, which enables the topology of an LED assembly to be changed in accordance with a supply voltage may be arranged to include the functionality of an LED driver according to the second aspect of the invention (i.e. determining a minimal holding current) or may be expanded with a switchable buffer as e.g. provided in an LED driver according to the third aspect of the invention.

In order to facilitate a retrofitting, it is worth noting that in an embodiment, an LED driver according to the present invention can determine, by applying a diagnostics program, which form of supply voltage is available at the LED driver terminals when the LED driver is connected to the power supply providing the supply voltage. As known by the skilled person, various ways of powering lighting applications are applied on the market at present. The following list is merely intended to be illustrative rather than being limited:

A power supply for a lighting application can e.g. provide one of the following voltage forms:

x V AC (at different frequencies such as 50/60/400 or 480 Hz)

x V DC x V as provided by an electronic transformer

....

When a LED driver according to the present invention is connected to such a voltage source, a waveform analyser or phase analyser may (when applied) determine, based on the voltage available (e.g. based on the minimum/maximum/average voltage/frequency spectrum of the voltage) determine the nature of the supply voltage. Depending on the outcome of the analysis or diagnosis, an optimal switching for a switchable buffer can be applied.

It can further be noted that such diagnoses of the supply voltage can be applied as an initialisation or can be applied substantially continuously, in order to adjust a control scheme of e.g. a switchable buffer depending on the available supply voltage.

It should further be mentioned that the embodiments of the LED drivers and lighting applications as described are mere illustrations of the various aspects of the invention, the invention only being limited by the scope of the claims as set forth.

The invention claimed is:

1. A lighting application comprising:
   an LED assembly comprising two or more LED units, each LED unit comprising one or more LEDs, the LED assembly further comprising a switch assembly comprising one or more controllable switches for modifying a topology of the LED assembly, the LED assembly, in use, being powered from a supply voltage, and
   a control unit comprising an input terminal arranged to receive an input signal representing at least one of a voltage level of the supply voltage and a load current of the LED assembly and an output terminal for providing a control signal to the switch assembly to control the switch assembly in accordance with the input signal, thereby modifying the topology of the LED assembly,
   wherein the switch assembly is configured to modify connections of the LED units to selectively form any one of all possible combinations of series and parallel connection connections of the LED units in the LED assembly, in accordance with the control signal received from the control unit, the possible combinations of series and parallel connections in the LED assembly comprising combinations whereby at least one of the LED units is short circuited by the switch assembly, and/or at least one of the LED units is disconnected by the switch assembly so that said at least one of the LED units to be disconnected is not powered,
   the lighting application being configured to selectively form, in accordance with the input signal representing the at least one of the voltage level of the supply voltage and the load current of the LED assembly, the combination of series and parallel connections of the LED units in the LED assembly from all possible combinations of series and parallel connections of the LED units in the LED assembly.

2. The lighting application according to claim 1, wherein the input signal at least represents the voltage level of the supply voltage and wherein the control unit is further configured to
   determine, based on the voltage level of the supply voltage, a maximum number of LED units in a series path and/or which LED units to be powered by the supply voltage, and
   control the switches according to the determination.

3. The lighting application according to claim 1, wherein the input signal at least represents the load current of the LED assembly and wherein the control unit is further configured to
   determine, based on the load current, whether to connect one of the disconnected LED units or disconnected one of the connected LED units, and
   control the switches according to the determination.

4. The lighting application according to claim 3, wherein the determination whether to connect one of the disconnected LED units or disconnect one of the connected LED units based on the load current takes account of a total number of parallel branches of the LED assembly.

5. The lighting application according to claim 3, wherein the load current is a total current provided to the LED assembly.

6. The lighting application according to claim 3, wherein the load current is a current provided to one of the LED units.

7. The lighting application according to claim 1, wherein the supply voltage comprises a periodic voltage, and wherein the lighting application further comprises an input buffer and a switching element connected to the input buffer, the switching element in a conductive state enabling to power the lighting application from the input buffer, and wherein the control unit is further arranged to control the switching element based on a signal representing the periodic voltage.

8. The lighting application according to claim 7, wherein the control unit is configured to operate the switching element to power the lighting application from the input buffer when the periodic voltage is lower than a forward voltage of one of the LED units.

9. The lighting application according to claim 1, wherein the input signal represents the voltage level of the supply voltage and the load current of the LED assembly, and wherein the control unit is further configured to
determine, based on the voltage level of the supply voltage, a maximum number of LED units in a series path and/or which LED units to be powered by the supply voltage,
determine, based on the load current, whether to connect one of the disconnected LED units or disconnect one of the connected LED units, and
control the switches according to the determination.

10. The lighting application according to claim 1 further comprising a drive unit for powering the LED assembly, the drive unit, in use, being powered from the supply voltage.

11. The lighting application according to claim 10, wherein the control unit is configured to drive the switch assembly to modify the topology of the LED assembly to keep a voltage drop over the LED assembly below an actual value of the supply voltage minus a minimum voltage across the drive unit.

12. The lighting application according to claim 11, wherein the minimum voltage across the drive unit is 1,5V.

13. The lighting application according to claim 10, wherein the drive unit comprises a linear regulator or a switching regulator for powering the LED assembly.

14. A lighting application according to claim 1, wherein the LED assembly comprises a serial connection of two or more LED units and wherein the switch assembly comprises two or more controllable switches for substantially short-circuiting each of the resp. two or more LED units independently.

15. The lighting application according to claim 1, wherein the supply voltage comprises a dimmer circuit output voltage.

16. The lighting application according to claim 1, wherein the supply voltage comprises a periodic voltage.

17. The lighting application according to claim 16, wherein the control signal is synchronized with the periodic voltage.

18. The lighting application according to claim 17, wherein the control unit is arranged to apply a duty cycle modulation of a current provided to the LED assembly by controlling the switch assembly.

19. The lighting application according to claim 18, wherein a duty cycle period of the duty cycle modulation is selected such that a period of the supply voltage divided by the duty cycle period results in an integer value.

20. The lighting application according to claim 1, further comprising a waveform analyzer arranged to assess the supply voltage and provide the signal to the control unit.

21. The lighting application according to claim 20, wherein the waveform analyzer is arranged to determine a zero crossing of the supply voltage.

22. The lighting application according to claim 20, further comprising a memory unit for storing waveform information obtained, in use, by the waveform analyzer.

23. A method of powering an LED assembly connectable to a power source, the LED assembly comprising two or more LED units, the LED assembly further comprising a switch assembly comprising one or more controllable switches for modifying a topology of the LED assembly, the LED assembly, in use, being powered by the power source, the method comprising:
detecting at least one of a voltage output level of the power source and a load current of the LED assembly, and
providing a control signal to the switch assembly to control the switch assembly based on the at least one of the voltage output level and the load current, thereby modifying the topology of the LED assembly,
controlling, responsive to the control signal, the switch assembly to modify connections of the LED units to selectively form any one of all possible combinations of series and parallel connections of the LED units in the LED assembly, in accordance with the control signal received from the control unit, the possible combinations of series and parallel connections in the LED assembly comprising combinations whereby at least one of the LED units is short circuited by the switch assembly, and/ or at least one of the LED units is disconnected by the switch assembly so that said at least one of the LED units to be disconnected is not powered,
thereby to selectively form, in accordance with the input signal representing the at least one of the voltage level of the supply voltage and the load current of the LED assembly, the combination of series and parallel connections of the LED units in the LED assembly from all possible combinations of series and parallel connections of the LED units in the LED assembly.

24. The method according to claim 23, further comprising:
determining, based on the voltage level of the supply voltage, a maximum number of LED units in a series path and/or which LED units to be powered by the supply voltage, and
controlling the switches according to the determination.

25. The method according to claim 24, further comprising the step of adjusting a duty cycle of the LED units in accordance with the voltage output level while maintaining a colour set point.

26. The method according to claim 23, the method further comprising:
determining, based on the load current, whether to connect one of the disconnected LED units or disconnect one of the connected LED units, and
controlling the switches according to the determination.

27. A lighting apparatus comprising:
an LED assembly comprising two or more LED units, each LED unit comprising one or more LEDs, the LED assembly further comprising a switch assembly comprising one or more controllable switches for modifying a topology of the LED assembly, the LED assembly, in use, being powered from a supply voltage, and
a control unit comprising an input terminal arranged to receive an input signal representing a voltage level of the supply voltage from which the LED assembly is powered and/or representing a load current of the LED assembly, and an output terminal for providing a control signal to the switch assembly, the control unit to control the switch assembly in accordance with the input signal, thereby modifying the topology of the LED assembly in accordance with the supply voltage as available,
wherein the switch assembly is configured to modify connections of the LED units to selectively form any one of all possible combinations of series and parallel connections of the LED units in the LED assembly, in accordance with the control signal received from the control unit, the possible combinations of series and parallel connections in the LED assembly comprising combinations whereby at least one of the LED units is short circuited by the switch assembly, and/or at least one of the LED units is disconnected by the switch assembly so that said at least one of the LED units to be disconnected is not powered,
the lighting apparatus being configured to selectively form, in accordance with the input signal representing the at least one of the voltage level of the supply voltage and the load current of the LED assembly, the combination of series and parallel connections of the LED units in the LED assembly from all possible combinations of series and parallel connections of the LED units in the LED assembly.

* * * * *